(12) United States Patent
Abramczyk et al.

(10) Patent No.: US 7,724,422 B2
(45) Date of Patent: May 25, 2010

(54) METHOD AND APPARATUS FOR PROVIDING LIGHT HAVING A SELECTED POLARIZATION WITH AN OPTICAL FIBER

(75) Inventors: Jaroslaw Abramczyk, New Britain, CT (US); Upendra H. Manyam, Weatogue, CT (US); Bryce N. Samson, Granby, CT (US); Kanishka Tankala, South Windsor, CT (US)

(73) Assignee: Nufern, East Granby, CT (US)

( * ) Notice: Subject to any disclaimer, the term of this patent is extended or adjusted under 35 U.S.C. 154(b) by 329 days.

(21) Appl. No.: 10/597,592

(22) PCT Filed: Jan. 31, 2005

(86) PCT No.: PCT/US2005/002908

§ 371 (c)(1),
(2), (4) Date: Nov. 29, 2007

(87) PCT Pub. No.: WO2005/074573

PCT Pub. Date: Aug. 18, 2005

(65) Prior Publication Data

US 2008/0095199 A1 Apr. 24, 2008

Related U.S. Application Data

(60) Provisional application No. 60/540,799, filed on Jan. 30, 2004.

(51) Int. Cl.
*H01S 3/00* (2006.01)
(52) U.S. Cl. .................... 359/341.1; 359/342
(58) Field of Classification Search ........... 359/341.1, 359/342
See application file for complete search history.

(56) References Cited

U.S. PATENT DOCUMENTS 4,395,270 A 7/1983 Blankenship (Continued)

FOREIGN PATENT DOCUMENTS

GB 2012983 A 8/1979

(Continued)

OTHER PUBLICATIONS

Eickhoff, W.; "In-Line Fibre-Optic Polariser"; Electronics Letters, Sep. 25, 1980, vol. 16, No. 20, pp. 762-764.

(Continued)

*Primary Examiner*—Mark Hellner
(74) *Attorney, Agent, or Firm*—Peter J. Rainville

(57) ABSTRACT

Optical apparatus (110, 500, 600, 800, 1000) for providing light having a selected linear polarization having a polarization ratio, the apparatus (110, 500, 600, 800, 1000) comprising a length of optical fiber (120, 504, 604, 804, 1001) comprising a rare earth for providing light having a first wavelength responsive to receiving pump light having a second wavelength that is different than said first wavelength, wherein if the length of optical fiber (120, 504, 604, 804, 1004) were placed in a first position between the length of fiber (120, 504, 604, 804, 1004) is substantially linearly oriented (20) the fiber (120, 504, 604, 804, 1004) could propagate at the first wavelength a fundamental mode and a plurality of higher order modes and the apparatus (110, 500, 600, 800, 1000) could provide light having a first polarization ratio for the selected linear polarization and an $M^2$ parameter, and wherein the length of fiber (120, 504, 604, 804, 1004) is positioned in a second position that increases the bend loss of the fiber relative to the first position such that, responsive to the increased bend loss, the apparatus (110, 500, 600, 800, 1000) can provide light having a reduced $M^2$ parameter as well as a second polarization ratio for the selected polarization that is increased relative to the first polarization ratio, the increase being at least 6 dB greater than the first polarization ratio, and wherein when the length of fiber (120, 504, 604, 804, 1004) is in the second position the apparatus (110, 500, 600, 800, 1000) can provide a slope efficiency that is at least 50% of the ratio of the second wavelength to the first wavelength.

30 Claims, 12 Drawing Sheets

U.S. PATENT DOCUMENTS

| | | | |
|---|---|---|---|
| 4,478,489 | A | 10/1984 | Blankenship |
| 4,515,436 | A | 5/1985 | Howard |
| 4,561,871 | A | 12/1985 | Berkey |
| 4,896,942 | A | 1/1990 | Onstott |
| 5,056,888 | A | 10/1991 | Messerly |
| 5,152,818 | A | 10/1992 | Berkey |
| 5,511,083 | A | 4/1996 | D'Amato |
| 5,561,675 | A | 10/1996 | Bayon |
| 5,818,630 | A | 10/1998 | Fermann |
| 5,890,816 | A | 4/1999 | Delavaux |
| 5,907,652 | A | 5/1999 | DiGiovanni |
| 6,049,415 | A | 4/2000 | Grubb |
| 6,072,811 | A | 6/2000 | Fermann |
| 6,115,526 | A | 9/2000 | Morse |
| 6,167,066 | A | 12/2000 | Gaeta |
| 6,334,019 | B1 | 12/2001 | Birks |
| 6,496,301 | B1 | 12/2002 | Koplow |
| 6,603,912 | B2 | 8/2003 | Birks |
| 6,724,528 | B2 * | 4/2004 | Koplow et al. ............ 359/341.1 |
| 6,825,974 | B2 | 11/2004 | Kliner |
| 6,888,992 | B2 | 5/2005 | Russell |
| 6,954,575 | B2 | 10/2005 | Fermann |
| 7,006,537 | B2 | 2/2006 | Minden |
| 2002/0159139 | A1 * | 10/2002 | Koplow et al. ............... 359/342 |

FOREIGN PATENT DOCUMENTS

| | | | |
|---|---|---|---|
| WO | 01/69313 | A1 | 9/2001 |
| WO | 03/021730 | A2 | 3/2003 |
| WO | 2004/030165 | A1 | 4/2004 |
| WO | 2005/031401 | A2 | 4/2005 |
| WO | 2005/074573 | A3 | 10/2006 |

OTHER PUBLICATIONS

Bergh, R.A. et al.; "Single-mode fiber-optic polarizer"; Optics Letters, Nov. 1980, vol. 5, No. 11, pp. 479-481.

Hosaka, T. et al.; "Single Mode Fibres with Asymmetrical Refractive Index Pits on Both Sides of Core"; Electronics Letters, Mar. 5, 1981, vol. 17, No. 5, pp. 191-193.

Hosaka, T. et al.; "Low-Loss Single Polarisation Fibres with Asymmetrical Strain Birefringence"; Electronics Letters, Jul. 23, 1981, vol. 17, No. 15, pp. 630-631.

Hosaka, T. et al.; "Single-Mode Fibre-Type Polarizer"; IEEE Journal of Quantum Electronics, vol. QE-18, No. 10, Oct. 1982, pp. 1569-1572.

Eickhoff, W.; "Stress-induced single-polarization single-mode fiber"; Optics Letters, Dec. 1982, vol. 7, No. 12, pp. 629-631.

Hosaka, T. et al.; "Fabrication of single-mode fiber-type polarizer"; Optics Letters, Feb. 1983, vol. 8, No. 2, pp. 124-126.

Varnham, M.P. et al.; "Single-Polarisation Operation of Highly Birefringent Bow-Tie Optical Fibres"; Electronics Letters, Mar. 31, 1983, vol. 19, No. 7, pp. 246-247.

Simpson, J.R. et al.; "A Single-Polarization Fiber"; Journal of Lightwave Technology, vol. LT-1, No. 2, Jun. 1983, pp. 370-374.

Snyder, A.W. et al.; "Single-mode, single-polarization fibers made of birefringent material"; J. Opt. Soc. Am., vol. 73, No. 9, Sep. 1983, pp. 1165-1174.

Varnham, M.P. et al.; "Coiled-birefringent-fiber polarizers"; Optics Letters, Jul. 1984, vol. 9, No. 7, pp. 306-308.

Okamoto, K.; "Single-polarization operation in highly birefringent optical fibers"; Applied Optics, vol. 23, No. 15, Aug. 1, 1984, pp. 2638-2642.

Okamoto, K. et al.; "High-Birefringence Polarizing Fiber with Flat Cladding"; Journal of Lightwave Technology, vol. LT-3, No. 4, Aug. 1985, pp. 758-762.

Stolen, R.H. et al.; "Short W-Tunnelling Fibre Polarisers"; Electronics Letters, Apr. 28, 1988, vol. 24, No. 9, pp. 524-525.

Chiang, K.S.; "Stress-Induced Birefringence Fibers Designed for Single-Polarization Single-Mode Operation"; Journal of Lightwave Technology, vol. 7, No. 2, Feb. 1989, pp. 436-441.

Shimizu, M. et al.; "Linearly Polarized Operation of Panda-Type Nd-Doped Fiber Lasers"; Japanese Journal of Applied Physics, vol. 28, No. 4, Apr. 1989, pp. L664-L666.

Ruhl, F.F. et al.; "True single-polarization design for bow-tie optical fibers"; Optics Letters, Jun. 15, 1989, vol. 14, No. 12, pp. 648-650.

Tajima, K. et al.; "A New Single-Polarization Optical Fiber"; Journal of Lightwave Technology, vol. 7, No. 10, Oct. 1989, pp. 1499-1503.

Messerly, M.J. et al.; "A Broad-Band Single Polarization Optical Fiber"; Journal of Lightwave Technology, vol. 9, No. 7, Jul. 1991, pp. 817-820.

Niay, P. et al.; "Polarization Selectivity of Gratings Written in Hi-Bi Fibers by the External Method"; IEEE Photonics Technology Letters, vol. 7, No. 4, Apr. 1995, pp. 391-393.

Kornreich, P. et al.; "Metal Strip Polarizing Fibers"; Proceedings of the SPIE, vol. 2749, 1996, pp. 11-18.

Loh, W.H. et al.; "High Performance Single Frequency Fiber Grating-Based Erbium:Ytterbium-Codoped Fiber Lasers"; Journal of Lightwave Technology, vol. 16, No. 1, Jan. 1998, pp. 114-118.

Kliner, D.A.V. et al.; "Polarization-maintaining amplifier employing double-clad bow-tie fiber"; Optics Letters, Feb. 15, 2001, vol. 26, No. 4, pp. 184-186.

Di Teodoro, F. et al.; "Diffraction-limited, 300-kW peak-power pulses from a coiled multimode fiber amplifier"; Optics Letters, Apr. 1, 2002, vol. 27, No. 7, pp. 518-520.

Nilsson, J. et al.; "Beyond 1 kW with Fiber Lasers and Amplifiers"; Proc. OFC 2003, vol. 2, pp. 685-686.

Ehlers, B. et al.; "High brightness diode lasers and diffraction-limited beam large-core fiber lasers open door for power scaling"; Solid State Diode Laser Technology Review, May 2003.

Tankala, K. et al.; "PM double-clad fibers for high power lasers and amplifiers"; Proceedings of SPIE, vol. 4974 (2003), pp. 220-229.

Manyam, U.H. et al.; "Laser fibers designed for single polarization output"; Advanced Solid-State Photonics, Feb. 2004, MA-6.

Liem, A. et al.; "High power linearly polarized fiber laser"; Conference on Lasers and Electro-Optics, May 2004, CMS4.

Edvold, B.; "Polarization Maintaining Fibers", Ph.D. Thesis, Technical University of Denmark, Apr. 1994.

EP 05712370.5 Supplementary European Search Report issued Mar. 16, 2009.

Koplow, J.P. et al.; "Single-mode operation of a coiled multimode fiber amplifier"; Optics Letters, vol. 25, No. 7, Apr. 1, 2000, pp. 442-444.

Weßels, P. et al.; "Highly sensitive beam quality measurements on large-mode-area fiber amplifiers"; Optics Express, Dec. 15, 2003, vol. 11, No. 25, pp. 3346-3351.

* cited by examiner

METHOD AND APPARATUS FOR PROVIDING LIGHT HAVING A SELECTED POLARIZATION WITH AN OPTICAL FIBER

CROSS-REFERENCE TO RELATED APPLICATIONS

This is a national stage application of PCT/US2005/002908, filed Jan. 31, 2005, which in turn claims priority to U.S. Provisional Patent Application No. 60/540,799, filed Jan. 30, 2004.

FIELD OF THE INVENTION

The present invention relates to optical devices, such as, for example, optical amplifiers, lasers and amplified spontaneous emission (ASE) sources, that can provide light having a selected polarization.

BACKGROUND

Optical fiber lasers and amplifiers can provide a flexible, rugged and simple source of light. It is often desirable that an optical fiber laser or amplifier can provide light having a selected polarization. Polarization refers to the direction of an electric field vector of a component of a propagating wave, and the selected polarization is typically specified as being present to a selected degree (e.g., a linear polarization can be specified as being present so as to have a selected polarization ratio to an orthogonal linear polarization). It can also be desired that the light provided be of high quality, that is, have one or more of low divergence, high coherence, a narrow spectrum, a narrow beam diameter and a low $M^2$ parameter.

Light having a selected polarization can be useful in a variety of circumstances. For example, a particular fiber laser or amplifier may not operate over the wide range of wavelengths available from other types of lasers or amplifiers. Many of the applications for which such light sources are used, such as medical, materials processing or defense applications, require a particular wavelength of light. It can be advantageous to convert the light from such a fiber laser or amplifier to a different wavelength. One of the more useful processes for converting light to a different wavelength, namely, launching light on to a crystal, can require that the light have a particular polarization. As another example, lithium niobate modulators, often used to impress information on light, also work most efficiently when provided with light having a selected polarization. U.S. Published Patent Applications US 2002/0172486 A1, entitled "Single Polarization High Power Fiber Lasers and Amplifiers", published Sep. 21, 2002; US 2002/0159139 A1, entitled "Polarization-Maintaining Optical Fiber Amplifier Employing Externally Applied Stress-Induced Birefringence", published Oct. 31, 2002 (now U.S. Pat. No. 6,724,528); and US 2003/0086668 A1, entitled "Linearly Polarized Fiber Amplifier", published May 8, 2003 (now U.S. Pat. No. 6,825,974), discuss various techniques for obtaining light having a selected polarization from fiber lasers and amplifiers. See also U.S. Pat. No. 6,072,811, entitled "Integrated Passively Modelocked Fiber Lasers and Method For Constructing the Same", issued Jun. 6, 2000.

In addition to the patents and applications noted above, see, for example, U.S. Published Patent Application US 2003/0123494 A1, entitled "Single Polarization Fiber Laser", published Jul. 3, 2003, which teaches fabricating a Bragg grating in a fiber to introduce a differential loss between two polarizations. See also U.S. Pat. No. 5,511,083, entitled "Polarized Fiber Laser Source", issued Apr. 23, 1996, which teaches a similar technique. The use of polarizing elements external to a fiber is also known. See, for example, U.S. Pat. No. 6,049,415, entitled "Polarization Maintaining Fiber Lasers and Amplifiers", issued Apr. 11, 2000.

In certain circumstances, available optical fiber lasers and amplifiers do not readily provide high enough power output. The above noted process for converting wavelength is not always efficient, and higher power can be required. Also, fiber lasers and amplifiers typically do not readily produce as much power as other types of lasers or laser amplifiers, such as bulk solid state devices, gas lasers, or diode lasers, which have gained acceptance in industrial settings such as welding and the like, in large measure due to the ability to provide high enough power. Accordingly, the number of applications for which fiber lasers can be used is unduly limited, despite their many advantages.

Nonlinear processes, such as stimulated Brillouin scattering (SBS) and stimulated Raman scattering (SRS) are responsible, in large part, for limiting the power output of fiber lasers and amplifiers. Though these processes are complex, each can typically be reduced, at least in part, by limiting the power density in the core of the fiber. The power density can be reduced by increasing the diameter of the core of the fiber and/or reducing the numerical aperture (NA) of the core, such that the fiber has a larger mode field diameter. Essentially, the power of the light propagating along the fiber is more spread out, such that the power density is reduced. Unfortunately, fibers having large core diameters can support multiple spatial (transverse) modes. The presence of such modes tends to degrade the quality of the light provided by the fiber. U.S. Pat. No. 6,496,301, issued on Dec. 17, 2002 to Koplow, Kliner and Goldberg, involves positioning a fiber, which can have a large core and a low NA, to substantially attenuate, via bend loss, higher order modes such that a fiber amplifier provides light having a lower $M^2$ parameter that would be provided absent the positioning of the fiber.

Existing techniques, however, can be considered unduly complex or expensive and impractical in certain applications.

Accordingly, it is an object of the present invention to address one or more of the deficiencies or drawbacks of the prior art.

SUMMARY OF THE INVENTION

In one aspect, the invention provides an optical apparatus for providing light having a selected linear polarization having a selected polarization ratio. As used herein, "light" is meant to include all electromagnetic radiation, whether visible or not, that those of ordinary skill in the art would recognize can be used in connection with the invention. In one embodiment, an apparatus according to the invention can comprise a length of optical fiber. The fiber can have a core and a cladding disposed about the core. The fiber can comprise a rare earth for providing light having a first wavelength responsive to receiving pump light having a second wavelength that is different than the first wavelength. If the length of optical fiber were placed in a first position wherein the length of fiber is substantially linearly oriented, the fiber could propagate (e.g., at the first wavelength) a fundamental mode and at least one higher order mode, such as, for example, a plurality of higher order modes, and the apparatus could provide light having a first polarization ratio for light of the selected linear polarization and an $M^2$ parameter. In one embodiment, the fiber is positioned in a second position that increases the bend loss in the fiber relative to said first position such that, responsive to the increased bend loss, the apparatus can provide light having a reduced $M^2$ parameter relative to the $M^2$ parameter as well as a second polarization ratio for the selected linear polarization that is increased relative to the first polarization ratio, the second polarization ratio being at least 6 dB greater that the first polarization ratio. When the fiber is in the second position the apparatus can provide a slope efficiency that is at least 50% of the ratio of the second wavelength to the first wavelength.

The polarization ratio is the ratio of the light power having the selected linear polarization to the light power having an orthogonal linear polarization. A high polarization ratio is often desirable. Slope efficiency is well known to one of ordinary skill in the art. In one practice, the slope efficiency can be at least 70% of the ratio of the second wavelength to the first wavelength.

Positioning the fiber can include arranging the fiber into a plurality of loops, including coiling the fiber such that all the coils have substantially the same and constant diameter.

In various embodiments of the invention the second polarization ratio can be at least 3 dB better (higher) than the first polarization ratio; at least 6 dB better; at least 8 dB better; at least 10 dB better; or at least 12 dB better than the first polarization ration. In conjunction with any of the foregoing, the first polarization ratio can be 0.5 dB or less, 1 dB or less, 2 dB or less, or 3 dB or less. The second polarization ratio can be at least 10 dB or, in another practice, at least 18 dB. "Rare earth", used herein, means one or more rare earths. The rare earth can comprise, for example, ytterbium, erbium, or erbium and ytterbium. The rare earth can consist essentially of ytterbium. By way of example, and without limitation, the first wavelength can be from about 980 to about 1080 microns.

$M^2$ parameters can be different in different practices of the invention. For example, in various practices of the invention the $M^2$ parameter (such as when the length of fiber is in the second position) can be no greater than 10, no greater than 8; no greater than 6, no greater than 4; no greater than 2; no greater than 1.8; no greater than 1.6; no greater than 1.4; no greater than 1.2; or no greater than 1.1. In other practices of the invention $M^2$ can be greater than 2; greater than 1.8; greater than 1.6; greater than 1.4; greater than 1.2; or greater than 1.1. In addition, $M^2$ can be about 2; about 1.8; about 1.6; about 1.4; about 1.2; and about 1.1. The $M^2$ can be from 1.1 to 1.4.

In various practices of the invention, the length of optical fiber can have a V-number for light of the first wavelength of no less than 3.5, no less than 4, or of no less than 10. The core the fiber can have a numerical aperture of no greater than 0.1 and a diameter of at least 15 microns. V-number refers to the V-number when the length of the fiber is substantially linearly oriented.

In another aspect of the invention, the fiber can comprise a second cladding disposed about the cladding wherein the second cladding tends to confine optical energy, (e.g., light) such as "pump" optical energy, to the cladding. The second cladding can comprise an index of refraction that is less than an index of refraction comprised by the cladding. The fiber can comprise a microstructured fiber, such as a photonic bandgap fiber or a fiber that includes regions that provide an appropriate average index of refraction. For example, the fiber can include gaps or voids that can be filled in part or completely with an appropriate material (liquid, gas, gel, solid, etc.) or that can be empty. One or both of the first and second claddings can be microstructured.

In yet another aspect of the invention, Applicants have discovered that an optical fiber device, such as, for example, a laser, can provide light having a desired polarization (e.g., substantially linearly polarized) and good beam quality by appropriately positioning an optical fiber, including a fiber that comprises an active material (e.g., a rare earth), to induce bend loss that attenuates one polarization (e.g., the polarization along the fast axis of a polarization maintaining (PM) fiber) more than another polarization (e.g., polarization along the slow axis), such that one or both of good slope efficiency and a good polarization ratio (e.g., the ratio of the power of light in desired polarization (e.g., light polarized along the slow axis) to the power of light in the undesired polarization (e.g., light polarized along the fast axis). Applicants have more particularly discovered that the foregoing technique works well when the fiber is a Large Mode Area (LMA) fiber (used herein to indicate a fiber having a core having a diameter of greater than 15 microns and a numerical aperture of the core relative to its cladding of less than 0.1), and that higher order modes as well as one of the polarizations of the fundamental mode are attenuated such that device can provide light having good beam quality (e.g., a low $M^2$ parameter) and substantially linear polarization (e.g., a good polarization ratio). LMA fibers have become popular for power scaling fiber lasers (see for example F. Di Teodoro, J. P. Koplow, S. W. Moore and D. A. V. Kliner, Optics Letters, v. 27, p 518, 2002) and amplifiers.

In certain practices the invention can provide an optical apparatus that provides substantially a selected linear polarization without the use of auxiliary polarizing apparatus where "auxiliary polarizing apparatus", as used herein, means any apparatus other than the fiber itself in a position or orientation taught by the invention (e.g., auxiliary polarizing apparatus can include a waveplate external to the fiber or a grating, which can written into a section of optical fiber, that acts in a significantly polarizing manner).

The invention can provide a simple technique that can avoid some of the more complex solutions upon which the prior art has focused. The invention can also be used as an amplified spontaneous emission (ASE) source, as well as a laser or amplifier or superfluorescent source.

In an additional aspect, the invention provides an optical apparatus comprising a first length of fiber having a core, a cladding disposed about the core and a rare earth for providing light having a first wavelength responsive to being pumped by light having a second wavelength that is different than the first wavelength. The first length of optical fiber can have a fundamental mode having first and second linear orthogonal polarizations and can attenuate light having the first wavelength and the first polarization by a first amount and can attenuate light having the first wavelength and the second polarization by a second amount that is less than the first amount.

The optical apparatus includes a second optical element in optical communication with the first length of optical fiber, wherein the second optical element receives light having a first polarization ratio. Polarization ratio can be defined as the ratio of light power having the first wavelength and the second polarization to light power having the first wavelength and the first polarization. The second optical element attenuates light having the first wavelength and the first polarization by a third amount and attenuates light having the first wavelength and the second polarization by a fourth amount that is less than the third amount and that is less than the second amount. The second optical element can provide light having a second polarization ratio that is larger than the first polarization ratio.

The third amount can be greater than the first amount. The second optical element can comprise a second length of optical fiber which can include a grating that attenuates light having the first wavelength and the first polarization more than the grating attenuates light having the first wavelength and the second polarization. The second length of optical fiber can include a length of polarizing fiber.

In yet a further aspect, the invention can provide an optical apparatus comprising an optical fiber comprising a rare earth for providing light having a first wavelength responsive to being pumped by light having a second wavelength that is different than the first wavelength. The optical fiber can be capable of propagating at the first wavelength a fundamental mode and at least one higher order mode, where each of the modes have first and second orthogonal linear polarizations, the first polarizations being substantially parallel, and wherein the effective modal index of the first polarization of the higher order mode at the first wavelength is greater than the effective modal index of the second polarization of the fundamental mode at the first wavelength. The fiber can comprise at least one grating for reflecting light having the first wavelength. The optical apparatus can comprise a laser for providing output light having the first wavelength, where the laser comprises the optical fiber.

The optical fiber can be positioned such that the attenuation of the second polarization of the at least one higher order mode is increased by a first amount due to bend loss relative to when the optical fiber is substantially linearly oriented and wherein when the fiber is so positioned the first polarizations of the fundamental and the at least one higher order mode are attenuated substantially less than said first amount due to any bend loss relative to when the fiber is substantially linearly oriented.

In another aspect, the invention provides an optical apparatus for providing light having a selected linear polarization at an output wavelength. The optical apparatus can comprise a polarization maintaining optical fiber having a core and a cladding disposed about the core, and the fiber can comprise a rare earth capable of providing light having the output wavelength responsive to being pumped by light having a wavelength different than the output wavelength. The core of the fiber, when the fiber is substantially linearly oriented, can propagate first and second linear orthogonal polarizations of a fundamental mode, and the core of the fiber can be multimode at the output wavelength when substantially linearly orientated such that a plurality of higher order modes can be supported by the core. The fiber is positioned such that, due to bend loss and independent of auxiliary polarization apparatus, the higher order modes and the first polarization of the fundamental mode experience increased attenuation relative to when the fiber is substantially linearly orientated and are substantially attenuated and the second polarization of the fundamental mode is substantially less attenuated than the first polarization of the fundamental mode. In one practice, when the fiber receives pump light, the output light can have a polarization ratio of the second polarization to the first polarization of at least 10 dB. In one practice, when the fiber receives pump light the output light can have an $M^2$ parameter of no greater than 2.5

The invention can also include methods practiced in accordance with the teachings herein.

In one aspect, the invention provides a method of providing output light having a selected linear polarization, comprising providing a length of optical fiber comprising a rare earth for providing output light having a first wavelength responsive to receiving pump light having a second wavelength that is different than said first wavelength, where the fiber can support at the first wavelength a fundamental mode having first and second orthogonal linear polarizations and a plurality of higher order modes; bending the fiber so as to increase the bend loss of the higher order modes and the second linear polarization such that the fiber can provide output light having an improved beam quality in terms of $M^2$ parameter and an improved polarization ratio for light having the first polarization relative to the second polarization; and refraining from introducing excessive bend loss for the first polarization such that the fiber can provide light including the first wavelength and the improved $M^2$ parameter and polarization ratio at a slope efficiency of greater than 50% of the ratio of the second wavelength to the first wavelength.

Further advantages, novel features, and objects of the invention will become apparent from the following detailed description of non-limiting embodiments of the invention when considered in conjunction with the accompanying FIGURES, which are schematic and which are not necessarily drawn to scale. For purposes of clarity, not every component is labeled in every one of the following FIGURES, nor is every component of each embodiment of the invention shown where illustration is not considered necessary to allow those of ordinary skill in the art to understand the invention.

DETAILED DESCRIPTION

Light is an electromagnetic wave having an electric field that can have a component that can oscillate along an axis that is perpendicular to the direction in which the light propagates. For an optical waveguide, such as an optical fiber, the waveguide is elongate along a longitudinal, or axial, direction and hence the electromagnetic wave propagates in that direction.

Figure 1:
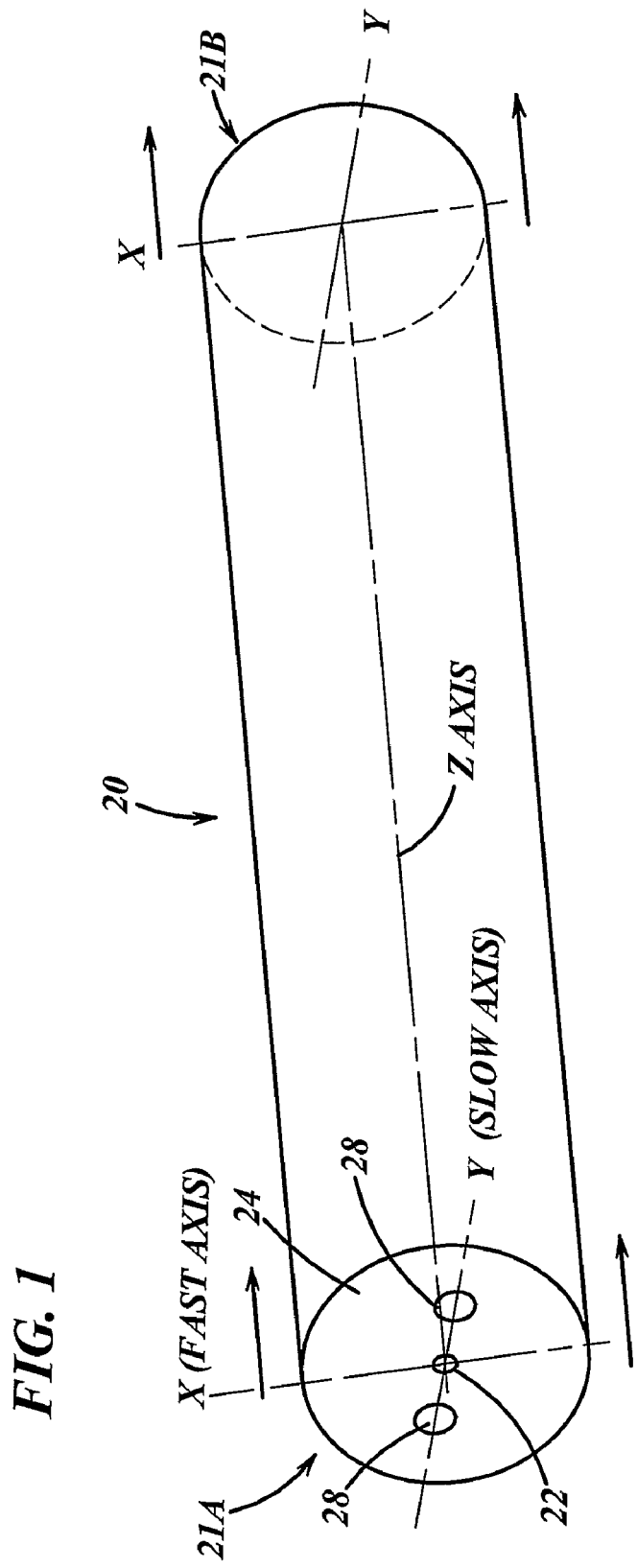
FIG. 1 illustrates a substantially linearly oriented optical fiber according to the present invention.

Consider the perspective view of the substantially linearly oriented optical fiber 20 shown in FIG. 1. Assume that light propagates along the z axis and from left to right, that is, from the end of the fiber 21A to the end 21B. If the electric field of the light at the end 21A vibrates along the horizontal axis (y axis in FIG. 1), the light is said to be horizontally polarized; if the electric field vibrates along the vertical axis (x axis in FIG. 1), the light is said to be vertically polarized. In most optical fibers, each transverse (spatial) mode (e.g., $LP_{01}$, $LP_{11}$, etc.) can include light in two orthogonal polarizations (i.e., both vertical and horizontal), and the light can couple back and forth between the two polarization states as the light propagates along the fiber, such that further along the length of the fiber 20, such as at the end 21B, the light can be a mixture of both vertical and horizontal polarizations, where the exact mixture is a function of time-varying environmental conditions (microbending of the fiber and the like) and is thus not readily predictable.

Polarization maintaining (PM) fibers, as well as polarizing (PZ) fibers, are known in the art for helping to control the polarization of light propagated by the fiber, such that if light of the proper polarization enters the fiber 20 at end 21A, the light at end 21B will be of substantially the same polarization. Polarization maintaining fibers can typically propagate both vertical and horizontal polarizations with substantially the same (e.g., low) attenuation, and can decouple (e.g., by asymmetrically stressing at least a portion of the fiber such that the vertical and horizontal polarizations travel at different speeds and/or have different wavelengths) the polarizations such that light launched into the fiber in the horizontal polarization tends to stay in that polarization and light launched into the fiber in the vertical polarization tends to stay in that polarization.

Typically a PM fiber is birefringent, meaning that the fiber provides a different index of refraction for one of the polarizations of a mode than it provides for the other of the polarizations of that mode, such that the wavelengths and/or phase velocity of the polarizations are different as well. Polarizing fibers subject one of the polarizations to substantially more attenuation than the other of the polarizations and substantially attenuate the one polarization, such that any light that couples from the lower loss polarization to the higher loss polarization, or any light that is directly launched into the higher loss polarization, is attenuated. Polarizing fibers can also be birefringent.

The optical fiber 20 of FIG. 1 includes a core 22 and a cladding 24 disposed about the core 22. In certain embodiments the cladding 24 can contactingly surround the core 22. However, for a first region to be "disposed about" a second region, as used herein, means that the first region surrounds, at least partially, the second region. The first region need not, but can, contactingly surround the second region. For example, in a typical double-clad fiber, described in more detail below, the first and second claddings are both considered to be disposed about the core, though the second cladding does not contactingly surround the core. The first cladding does typically contactingly surround the core, and the second cladding does typically contactingly surround the first cladding.

"Substantially linearly oriented", as used herein, means that the fiber, if coiled or otherwise arranged to save space, is so arranged such that the properties of the fiber being measured are essentially the same as when the fiber is straight.

As shown in FIG. 1, the fiber 20 can include a pair of axially extending stress inducing regions 28 that help induce selected birefringence in the optical fiber. As noted above, birefringence refers to at least a region of the fiber, such as, for example, part or all of the core 22 or the cladding 24, having a substantially different index of refraction for one polarization of light than for the orthogonal polarization of light. Many different fiber designs can provide birefringence. Known in the art is the so called "Panda" design, where a fiber includes at least a pair of axially extending stress-inducing regions 28 that are diametrically opposed about and spaced from the core 22. Each of the regions 28 has a circular outer perimeter. The "bowtie" design also includes a pair of axially extending stress inducing regions, but the regions do not have a circular outer perimeter and are often fabricated by a different technique (gas phase etching) than the circular stress inducing regions of the Panda design, which, for example, can be made by drilling holes in a preform, inserting pre-fabricated stress rods into the holes, and drawing the perform with the stress rods into optical fiber. Panda, bowtie, and other designs, (such as fibers having an appropriate non-circular cladding disposed about the core and/or a non-circular core) are known for providing birefringence. Combinations of the foregoing designs can also be used, as is appreciated by one of ordinary skill in the art.

Figure 2:
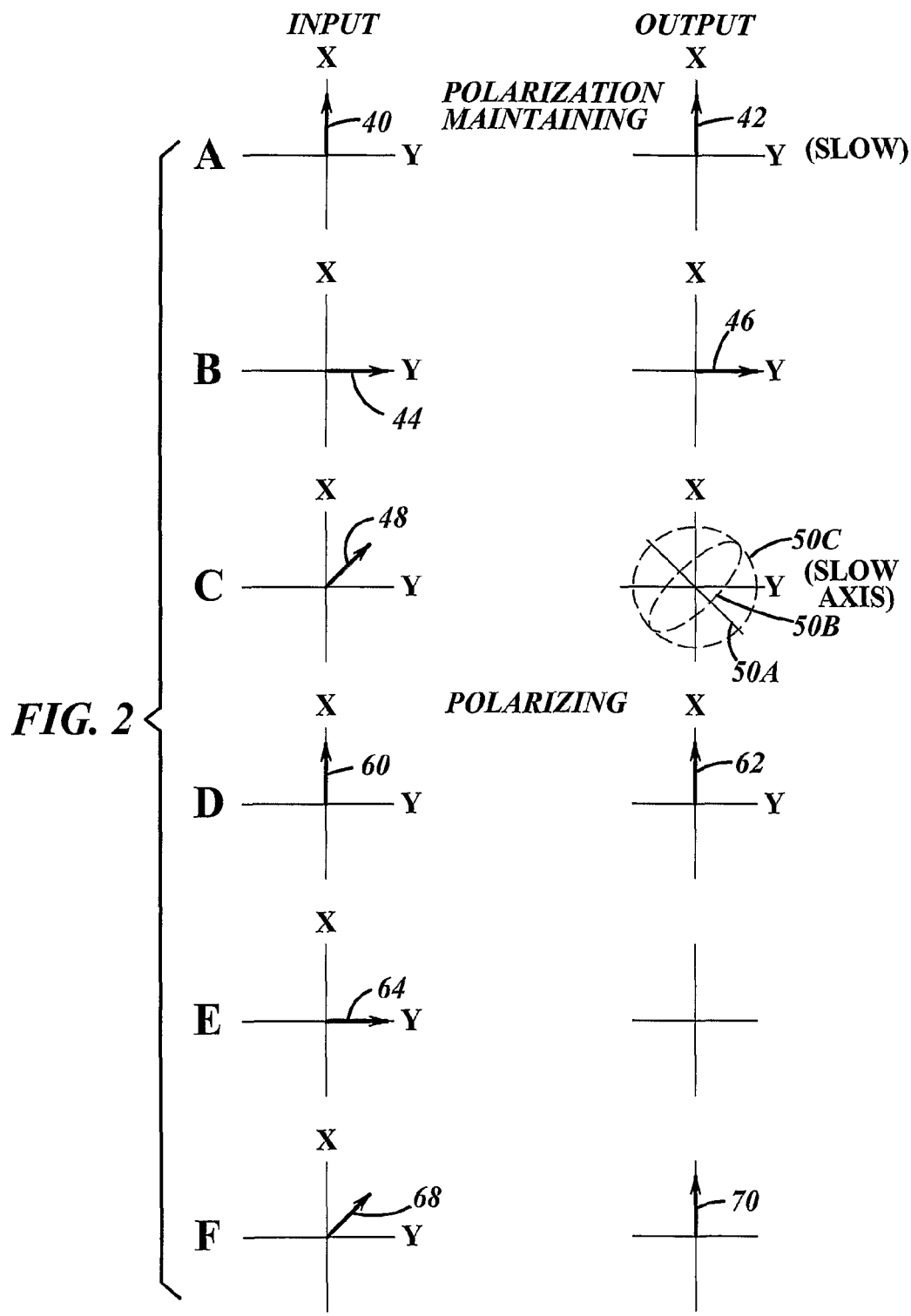
FIG. 2 qualitatively indicates examples of polarization maintaining and polarizing behavior in optical fibers.

FIG. 2 conceptually illustrates the difference between polarization maintaining behavior and polarizing behavior in an optical fiber. FIG. 2 illustrates six cases, delineated A-F, showing various input polarizations and output polarizations. Cases A through C correspond to polarization maintaining behavior of an optical fiber; cases D-F correspond to polarizing behavior of an optical fiber. For reference purposes consider that the input polarization described in FIG. 2 starts at the left hand side of fiber 20, such as at end 21A, shown in FIG. 1 and the output polarization is the light as is propagates along fiber 20 at the right hand side of FIG. 1, such as at end 21B. In conjunction with the following discussion of FIG. 2, it should be noted that the fiber 20 may or may not be substantially linearly oriented, and may or may not have the particular structure shown in FIG. 1.

In case A, a fiber exhibiting polarization maintaining behavior propagates input light polarized along the x (or fast) axis, as indicated by the vector 40, and the light propagates at the output end as still largely polarized along the x (or fast) axis of the fiber, as indicated by the vector 42. Preferably, the signal is minimally attenuated. In case B, the same fiber propagates input light that is polarized along the y (or slow) axis, as indicated by vector 44, and the output light is also largely polarized along the y (or slow) axis, as indicated by vector 46. Again, the signal is preferably minimally attenuated. In case C, the input is linearly polarized, but includes components along each of the x and y (fast and slow) axes.

Note that the terms "fast" and "slow" are relative terms that relate to the speed of the light having a polarization that is substantially parallel to the axis being discussed. The term "fast polarization" means that polarization of light that is substantially parallel to the fast axis, and the term "slow polarization" means that polarization of light that is substantially parallel to the slow axis. In general, the speed of light is a function of the index of refraction, and the higher the index of refraction, the slower the speed of the light. Thus the index of refraction for the fast axis polarization is lower than the index of refraction for the slow axis polarization, and, as noted above, the fiber is said to be birefringent because the index of refraction is different for the two polarizations.

Proceeding to case C in FIG. 2, it is first noted that, in general, any polarization of light can be considered to be an appropriate combination of polarizations along the x and y axis. In such a general combination the polarizations can have different relative strengths and a particular phase relationship, and based on the relative strengths and the phase relationship can ultimately add up to provide, for example, linear, elliptical, or some other circular polarization. In case C, the input light has a component along both the x and y axes, and the polarization propagating at the output end will vary, depending at least in part on the length of the optical fiber. Assuming that the components along each of the x and y axes are substantially similarly attenuated, which is typically true for a PM fiber, the polarization of the output light can be linearly polarized along a 45 degree axis to the x and y axes, or even elliptically polarized, or circularly polarized, as indicated by reference numerals 50A, 50B and 50C. The foregoing are only some of the possibilities for the output light; many more exist, as is appreciated by one of ordinary skill in the art.

In practical applications the output polarization for case C will vary as a function of the length of the fiber, which changes the phase relationship between the polarizations, as well as the environmental conditions, which affects the degree of coupling between the polarizations. The output polarization is somewhat indeterminate, and PM fiber, which is typically used to provide polarization maintaining behavior, is usually used for propagating light principally polarized along one of the slow and fast axes, and not for light that has a component along each of the axes.

Cases D-F illustrate polarizing behavior. In case D, a fiber exhibiting polarizing behavior propagates input light polarized along the x axis, as indicated by the vector 60, and the light propagates at the output end as still largely polarized along the x axis of the fiber, as indicated by the vector 62. In case E, the same fiber receives at one end input light that is polarized along the y axis, as indicated by vector 64, and in this instance little or no light propagates at the other end of the fiber, because the fiber is polarizing and highly attenuates light polarized along the y axis. In case F, the input light is linearly polarized, as indicated by vector 68, but includes components along each of the x and y axes. Only the x component propagates at the output of the fiber, as indicated by vector 70, for this component is not highly attenuated, as opposed to the y component of the polarization.

Note that for cases D-F the x and y axes are not labeled fast and slow, as by design a PZ fiber can be made to highly attenuate one polarization rather than the other, and need not even have axes that can be identified as slow and fast. A fiber need not be birefringent to provide polarizing behavior. In many fibers that are intentionally designed to be polarizing, there is a fast axis and light parallel to the fast axis is more attenuated, as light polarized along this axis sees a lower index of refraction and more readily tunnels through the W-shaped refractive index profile often used in this type of fiber. In the examples above, polarizing behavior is shown, to more clearly explain the concept, as highly attenuating one of the polarizations. However, polarizing behavior can include a selected difference between the attenuation of the x and y polarizations, where neither of the polarizations is necessarily highly attenuated. The amount of polarizing behavior required in a particular application depends on the application, and other factors, such as the length of the fiber providing the polarizing behavior, as is discussed in more detail below.

Note that the same fiber can demonstrate polarizing behavior when propagating light of one wavelength and polarization maintaining behavior when propagating light of a different wavelength.

It is important to avoid confusion regarding the terms "polarizing behavior"; "polarization maintaining behavior"; "polarizing fiber" or "PZ fiber"; and "polarization maintaining fiber" or "PM fiber". Certain optical fibers have become known to those of ordinary skill in the art as "polarization maintaining" or "PM" fibers, and certain optical fibers have become known to those of ordinary skill in the art as "polarizing" or "PZ" fibers. As used herein, the terms "polarizing fiber" (or "PZ fiber") and "polarization maintaining fiber" (or "PM fiber") are intended to refer to those fibers understood by one of ordinary skill in the art to represent, respectively, polarizing and polarization maintaining fibers. Citations of patents and publications describing each type of fiber that are considered representative of the understanding of one of ordinary skill are provided below. The terms "polarizing behavior" and "polarization maintaining behavior" are used as defined herein. The term "polarizing behavior" is not synonymous with "polarizing fiber" and the term "polarization maintaining behavior" is not synonymous with "polarization maintaining fiber". For example, according to one aspect of the invention, a rare-earth doped (RED) fiber normally considered to be "polarization maintaining" by one of ordinary skill in the art can be appropriately positioned (e.g., arranged in a number of loops of a constant and selected diameter) to demonstrate polarizing behavior at a selected wavelength whereas when substantially linearly oriented the fiber provides polarization maintaining behavior at that wavelength. Polarization maintaining behavior and polarizing behavior are discussed further below.

Examples of Polarizing Fibers

Fiber designers intending to provide a polarizing fiber use different approaches. For example, in one approach, birefringence is introduced into both the core and the cladding, with the core having a higher birefringence than the cladding, and such that one of the polarizations has larger mode field diameter and is sufficiently more susceptible to bend loss. In another approach, the index of the core and cladding are equal for one of the polarizations, such that the one polarization is not guided. In another approach, the birefringence of the core and cladding are equal, but the mode for one of the polarizations is "leaky" because it has a small component along the direction of the other polarization which sees loss, as the fiber is designed such that the effective index for the one polarization is lower than the index of refraction for the other polarization. In yet a further approach, a polarizing fiber can include absorptive stress inducing regions. In an additional approach, a "W" shaped refractive index profile allows one of the polarizations to "tunnel" through the "well" of the "W" and sees the higher index of the cladding outside the well. Other approaches include providing a metal film on one side or on opposing sides of the optical fiber (to selectively attenuate one polarization) or providing a metal cladding over the fiber. Typically, a polarizing fiber includes a window of wavelengths, such as, for example a window of 20 nm or 100 nm, wherein one polarization has high loss and the other polarization has lower, and hopefully, acceptable, loss for the application in which the polarizing fiber is to be used.

Various approaches are described in the following publications and patents that are understood to address polarizing fibers: J. R. Simson et al., Journal of Lightwave Technology, 1, 370 (1983); K. Okamato, Applied Optics 23, 2638 (1984); Kin Seng Chang, Journal of Lightwave Technology, 7, 436 (1989); Michael J. Messerly et al., Journal of Lightwave Technology, 9, 817 (1991); Frank F. Ruhl and Danny Wong, Optics Letters, Vol. 14, 648 (1989); M. P. Varnham et al., Electronics Letters, 19, 246 (1983); M. P. Varnham et al., Optics Letters 9, 306 (1984); K. Okamoto, Applied Optics 23, 2638 (1984); K. Okamoto, Journal of Lightwave Technology 3, 758 (1985); W. Eickhoff, Optics Letters 7, 629 (1982); A. W. Snyder and F. Ruhl, Journal Optical Society of America, 73, 1165 (1983); R. H. Stolen et al., Electronics Letters, 24, 524 (1988); K. Tajima et al., Journal of Lightwave Technology, 7, 1499 (1982); K. S. Chiang, Journal of Lightwave Technology, 7, 436 (1989); W. Eickhoff, Electronics Letters, 16, 762 (1980); P. Kornreich et al., Proceedings of the SPIE 2749, 11 (1996); T. Hosaka et al., Optics Letters 8, 124 (1983); T. Hosaka et al., Journal of Quantum Electronics, 18, 1569 (1982); R. A. Bergh et al., Optics Letters 5, 479 (1980). See also the following U.S. patents: U.S. Pat. No. 4,515,436, entitled "Single-Mode Single Polarization Optical Fiber", filed Feb. 4, 1983 and issued May 7, 1985 to Howard, Pleibel, Simson, and Stolen; and U.S. Pat. No. 5,056,888, entitled "Single-Mode, Single-Polarization Optical Fiber", filed Jul. 17, 1989 and issued Oct. 15, 1991 to Messerly, Onstott and Mikkelson.

Examples of Polarization Maintaining Fibers

Several U.S. patents and publications are understood to describe PM fibers. See, for example, U.S. Pat. No. 4,896,942, entitled "Polarization Maintaining Optical Fiber", filed Feb. 3, 1989 and issued Jan. 30, 1990 to Onstott, Messerly, Mikkelson and Donalds. Corning Glass Works of Corning, N.Y. is well known for developing fibers designed to be polarization maintaining or retaining. See U.S. Pat. No. 4,395,270, entitled "Method of Fabricating a Polarization Retaining Single Mode Optical Fiber", filed Apr. 13, 1981 and issued Jul. 26, 1983 to Blankenship and Keck. See also U.S. Pat. No. 4,478,489, entitled "Polarization Retaining Single Mode Optical Waveguide", filed Mar. 28, 1983 and issued Oct. 23, 1984 to Blankenship and Keck, as well as U.S. Pat. No. 4,561,871, entitled "Method of Making Polarization Preserving Optical Fiber", filed Dec. 27, 1983 and issued Dec. 31, 1985 to Berkey. In addition, see U.S. Pat. No. 5,152,818, entitled "Method of Making Polarization Retaining Optical Fiber", filed Nov. 9, 1990 and issued Oct. 6, 1992 to Berkey, Bhagavatula, Hawk and Tarcza. Publications include G.B. Patent Application 2,012,983 A, entitled "Optical Waveguides Having Non-Uniform Outer Jackets", published Aug. 1, 1979 in the names of Kaminow, Pleibel, Ramaswamy and Stolen; Hosaka et al., Electronics Letters, 17, 191 (1981); Hosaka et al., Electronics Letters, 17, 631 (1981); and D. Kliner et al., Optics Letters 26, 184 (2001).

Many PM fibers include one or more stress inducing regions that are intended to create a physical stress in a selected portion of the fiber, such as in at least a part of, or in all of, one or both of the core or the cladding of the PM fiber. This physical stress, as a result of the stress-optic effect, causes the optical fiber to have increased birefringence. Accordingly, light of one polarization has a different propagation constant than light of the other polarization, and because of the different propagation constants, light that does couple from one polarization (e.g., light polarized along the x axis) into the other polarization (e.g., light polarized along the y axis) at a first location along the length of the fiber, due, for example, to a bend or other environmental condition, does not necessarily add constructively at a second location along the length of the fiber with light that couples from the first polarization to the second polarization at the second location. Typically the physical stress field is radially asymmetric, where the radius extends perpendicular to the elongate axis along which the fiber extends.

The stress inducing regions typically comprise material having a different thermal coefficient of expansion (TCE) than the TCE of an adjacent region of the optical fiber. The different TCE's cause stress to be induced in the fiber when the fiber cools after being drawn from a heated preform. Stress inducing regions are well known in the art and the proper composition for achieving the particular TCE and hence inducing a particular stress in the fiber are also well known and only briefly discussed here. Stress inducing regions typically include, for example, one or more of boron, phosphorous, germanium, aluminum and titanium to provide the desired TCE. Boron and phosphorus are understood to be the most popular. These materials can be incorporated into the stress rods in a variety of compounds, such as, for example, $B_2O_3$, $BPO_4$, $P_2O_5$, $GeO$ and $GeO_2$.

PM fibers typically use birefringence to reduce the effect (e.g., constructive superposition) of any coupling between the x and y polarizations. Typically, this means that a PM fiber is designed to have as high a birefringence as possible. Fibers having increased birefringence are typically one or more of more expensive and more difficult to manufacture than fibers having lower birefringence.

However, coupling between polarizations can be reduced such that increased birefringence is supposedly not as necessary. See the aforementioned published U.S. Patent Application US 2002/0172486 A1.

Although PM fibers can be difficult to manufacture, they are readily commercially available. Polarization maintaining birefringent fibers are available commercially from a variety of vendors, such as for example, Fujikura and Nufern (Panda); 3M (elliptical clad) and Stocker-Yale and Fibrecore Ltd. (bowtie). Birefringence can also be induced by appropriately coiling an optical fiber, as taught in U.S. Published Application No. US 2002/0159139, published Oct. 31, 2002 in the names of Koplow, Kliner and Goldberg (now U.S. Pat. No. 6,724,528).

PZ fibers are generally understood to be even more difficult to manufacture and to use than PM fibers, have not gained wide practical acceptance, and are not understood to be less readily commercially available. Many designs of PM fibers, on the other hand, can be manufactured with high repeatability, have gained wide practical acceptance and hence are used in many existing commercial products, and are readily commercially available from a number of vendors.

Figure 3:
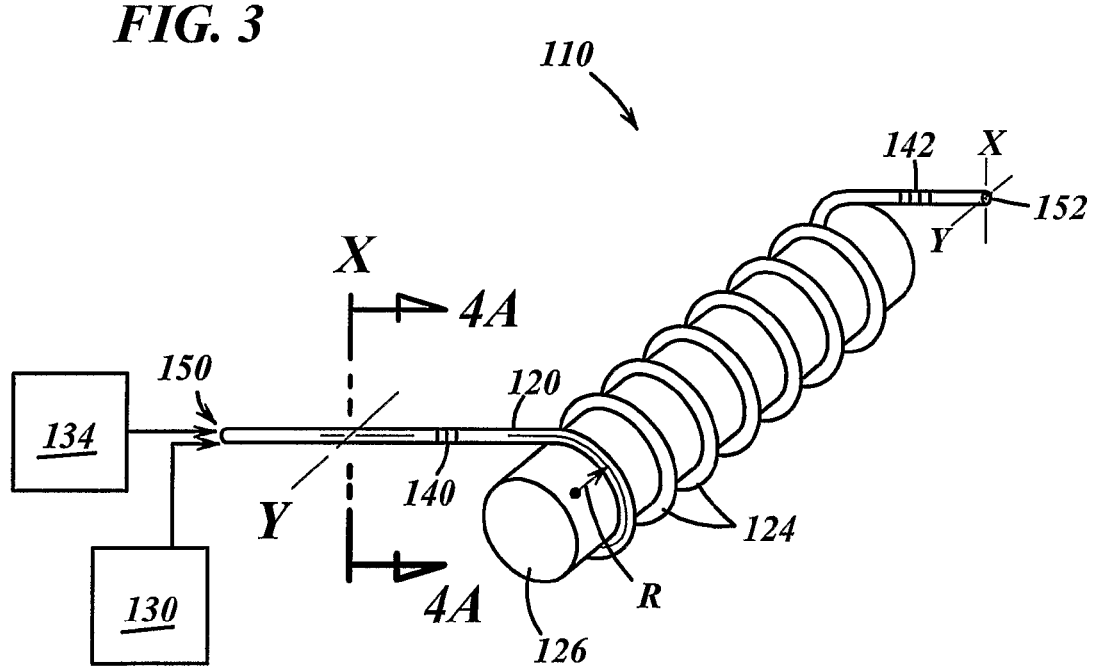
FIG. 3 schematically illustrates one embodiment of an apparatus according to the present invention.

FIG. 3 illustrates an optical apparatus 110 for providing light having a selected linear polarization according to one embodiment of the present invention. The optical apparatus 110 comprises a length of optical fiber 120 comprising a rare earth for providing light having a first wavelength responsive to being pumped by light having a pump wavelength that is different than the first wavelength. When in a first position, such as by being substantially linearly oriented (e.g., as the fiber shown in FIG. 1) the length of fiber 120 can propagate a fundamental mode and at least one higher order mode and the apparatus 110 can provide light having a first polarization ratio for light of the first polarization (this includes the situation where light can be essentially unpolarized). The fiber is positioned in a second position, such as shown in FIG. 3, that selectively increases the bend loss in the fiber such that responsive to the increased bend loss the apparatus 110 can provide light having the linear polarization and a second polarization ratio that is a least 6 dB better than the first polarization ratio. When in the aforementioned second position the light provided by the apparatus can have one or both of a good $M^2$ parameter and good slope efficiency. The improvement in $M^2$ parameter for light provided by the optical apparatus when in the second position as compared to the first position can be quite dramatic. The $M^2$ when in the first position can be, in various embodiments, no less than 10, no less than 20, no less than 30, or no less than 50.

In some embodiments the optical fiber 120 can exhibit polarization maintaining behavior rather than polarizing at the first wavelength when in the first position and polarizing behavior when the fiber is in the second position. In one embodiment of the invention, the rare earth comprises ytterbium and the light provided by the rare earth includes a wavelength of about 1 (e.g., 1.06) micron. The pump wavelength can include wavelengths of 915 nm or 975 nm. The optical fiber can be a fiber that one of ordinary skill in the art would consider to be a PM fiber.

Typically the optical fiber is positioned by winding the fiber in a plurality of loops, or coils 124, about a cylindrical mandrel 126 having a circular outer perimeter, such that the loops have a substantially constant diameter and all the loops have substantially the same diameter. The optical fiber can also be supported using the support structure described in PCT Application PCT/US04/31723, which is co-owned with the present application, and which is herein incorporated by reference. Note that in one practice of the invention, it is not necessary to arrange the x-axis or y-axis of the optical fiber in any particular orientation with respect to the loops of fiber; the fiber can include a twist that varies the orientation of the fiber relative to the loop. For illustrative purposes, consider a single loop and a plane that intersects substantially all of the longitudinal axis of the fiber loop. It is not necessary to arrange the optical fiber such that the angle between the plane and the x axis of the fiber is substantially the same around the loop.

In various aspects, the positioning of an optical fiber includes arranging the fiber into a plurality loops wherein each of the loops has at least one diameter of no greater than 13 cm; no greater than 12 cm; no greater than 11.5 cm; no greater than 11 cm; no greater than 10.5 cm; no greater than 10 cm; of less than 10 cm; no greater than 9.75 cm; no greater than 9.5 cm; no greater than 9.25 cm; no greater than 9 cm; no greater than 8.75 cm; no greater than 8.5 cm; no greater than 8.25 cm; no greater than 8 cm; and no greater than 7.75 cm. It is understood that certain shapes for a loop (e.g., an ellipse) can have more than one diameter (e.g., a diameter along the minor axis, a diameter along the major axis, and any number of diameter along axes other than the major and minor axes) and that the phrase "at least one diameter" means that at least one of the diameters satisfies the foregoing.

Alone or in combination any one of the foregoing recitations of ranges of diameters, it is noted that in certain practices of the invention, the diameter of each of said plurality can be no less than 1 cm; no less than 2 cm; no less than 3 cm, or no less than 5 cm.

The at least one diameter can be from 7.5 to 10 cm; from 7.5 cm to 9.9 cm; from 7.5 cm to 9.9 cm; from 7.5 cm to 9.75 cm; from 7.5 cm to 9.5 cm; from 7.5 cm to 9.25; from 7.5 cm to 8.75 cm; and from 7.5 cm to 8.25 cm. The at least one diameter can be from 8.0 cm to 9.9 cm; from 8.25 cm to 9.9 cm; from 8.5 cm to 9.9 cm; from 8.75 cm to 9.9 cm; from 9 cm to 9.9 cm; and from 9.5 cm to 9.9 cm.

Also the at least one diameter can be about 7.5 cm; about 7.75 cm; about 8 cm; about 8.25 cm; about 8.5 cm; about 8.75 cm; about 9.0 cm; about 9.25 cm; about 9.5 cm; about 9.75 cm; about 9.8 cm; and about 10 cm, where "about", as used in the foregoing recitation, means + or −0.125 cm.

The diameter or range of diameters can depend on the NA of the fiber. Lower NA's tend to allow the use of large diameters. Larger diameters are preferable, as less physical stress is imposed on the optical fiber. High physical stress can cause microcracks to propagate and lead to an early failure of the optical. We note that the present invention can operate with diameters that are larger than those taught in U.S. Pat. No. 6,496,301, which tend to be smaller.

The optical apparatus 110 can include a light source 130 that is optically coupled to the optical fiber 120 for providing pump light. The optical apparatus 110 can also include a light source 134 for providing light having the first wavelength for amplification thereof. The optical apparatus can comprise at least one reflector 140, which can comprise a grating, such as, for example, a Bragg grating formed via the selective application of actinic radiation, such that the apparatus 110 can operate as a laser. The apparatus 110 can comprise a second reflector 142. One of the reflectors is usually less reflective than the other of the reflectors, as is known in the art. One or both of the ends, indicated by reference numerals 150 and 152, of the fiber 120 can be used as reflectors, as is also known in the art. Although it is common for a laser to include two spaced reflectors to form a cavity therebetween, single reflector lasers, such as the distributed feedback (DFB) laser, are known in the art and use a distributed reflector, typically in the form of a grating, and can provide narrow linewidth light.

As noted above, the fiber 120 comprises a rare earth for providing light of a first wavelength responsive to receiving (e.g., being "pumped by") light of a second wavelength (e.g., "pump light"). "Rare earth", as used herein, means one or more rare earths, such as, for example, ytterbium, erbium, erbium/ytterbium, lanthanum or thulium. The rare earths can be selected by those of ordinary skill in the art of the field of pumped fibers, for example from the Lanthanide group of elements in the periodic table (elements having the atomic numbers 57-71). As is also known in the art, it can be advantageous to include other materials with the rare earth materials, to adjust the bandwidth of the gain or absorption spectrum of the fiber or to facilitate the incorporation of higher concentrations of the rare earth dopants by, for example, reducing the clustering of the rare earth material(s). Aluminum is known to be useful for helping to incorporate additional rare earth material into the fiber. Materials can also be added to provide a selected index of refraction. Useful materials, typically added as dopants, include germanium, fluorine, phosphorous, boron and titanium. It can be useful to co-dope the fiber with two or more rare earths, such as, for example, erbium and ytterbium, as noted above.

Figure 4A:
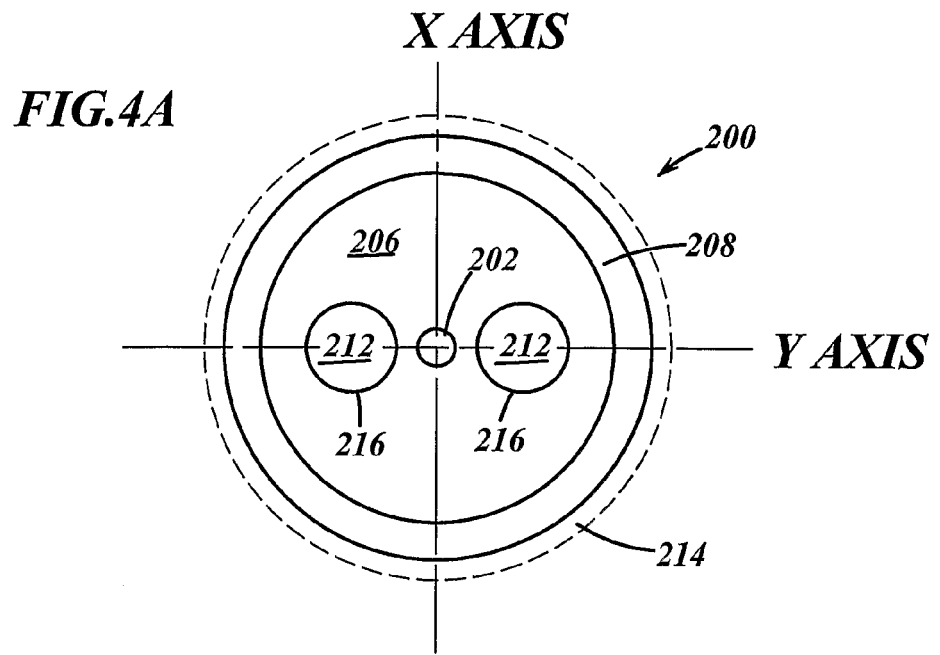
FIG. 4A is a cross section of one embodiment of an optical fiber that can be used with the present invention.

FIG. 4A illustrates an optical fiber 200 that can be used as the optical fiber 120 shown in FIG. 3. The optical fiber 200 comprises a core 202, a first cladding 206 disposed about the core 202 and a second cladding 208 disposed about the first cladding 206. In the fiber 200 illustrated in FIG. 4A, the first cladding 206 contactingly surrounds the core 202 and the second cladding 208 contactingly surrounds the first cladding 206. As is well known in the art the first cladding 206 can serve to receive and guide light having the pump wavelength for provision to the rare earth comprised by the fiber 200. Typically the second cladding 208 comprises an index of refraction that is less than an index of refraction comprised by the first cladding 206 such that the light having the pump wavelength tends to be guided by the first cladding 206. The second cladding 208 can comprise a low index acrylate polymer, as is known in the art.

The second cladding 208 can include longitudinally extending features (e.g., can be microstructured) that have a different index of refraction than the material that surrounds the feature so as to provide a selected effective index of refraction, which can be quite low and help provide a larger NA for the first cladding 206 (e.g., 0.5 or higher, such as 0.6 or 0.7). The features can include voids that include a gas (e.g., air) or are evacuated, or that include a liquid or solid having a different index of refraction (e.g., lower) than the material that defines the features. See, for example, U.S. Pat. No. 5,907,652, entitled "Article Comprising An Air-Clad Optical Fiber", issued May 25, 1999. See also U.S. Pat. No. 6,115,526, entitled "Ultra High Numerical Aperture High Power Optical Fiber Laser", issued Sep. 5, 2000, where the second cladding comprises a gas. The first cladding can be microstructured and/or comprise a gas, as described above, particularly when the fiber is not double clad and/or when the core of the fiber receives pump light directly (e.g., the fiber is end pumped).

The first cladding 206 can comprise glass such as a silica based glass. It is often desirable that the first cladding 206 consists or consists essentially of silica glass to help ensure that the optical fiber 200 can handle high power levels of light having the pump wavelength. Often obtaining a higher power laser or optical amplifier means providing a higher power of pump light to the optical fiber 200, and the optical fiber 200 should be able to propagate the pump light for absorption by the rare earth included in the fiber 200 without damaging, such as by photodarkening, the fiber 200.

The fiber 200 can comprise an additional region 214 disposed about the second cladding 208. The additional region 214 can comprise a polymer for protecting the optical fiber 200, such as, for example, a relatively hard polymer coating, as is known in the art. The additional region 214 can also be a third cladding that comprises an index of refraction that is less than an index of refraction comprised by the second cladding 208. In this instance the first cladding 206 and the second cladding 208 can each comprise, consist of or consist essentially of a glass, and the third cladding can comprise, consist or consist essentially of a polymer or a glass. For example, the first cladding 206 can comprise a silica glass doped with a dopant that increases the index of refraction of the silica glass. The second cladding 208 can consist or consist essentially of silica or can include sufficient concentration of a dopant, such as a dopant or dopants that increases or decreases the index of refraction of the silica, to substantially change the index of refraction, with the proviso that the second cladding 208 should comprise an index of refraction that is less than the index of refraction comprised by the first cladding. The region 214 can comprise a polymer, such as a fluorinated acrylate polymer, or can comprise silica that is doped with an appropriate dopant, such as, for example, a dopant such as fluorine or boron that decreases the index of refraction of the silica glass.

The fiber 200 can be a polarization maintaining fiber. For example, with reference to FIG. 4A, the optical fiber 200 includes a pair of elongate stress inducing regions indicated by reference numerals 212. Preferably the stress inducing regions 212 each have a circular outer perimeter 216 and are spaced from and diametrically opposed about the core 202, as shown in FIG. 4A. Typically the cladding 206 is disposed about stress inducing regions 212, and, as shown in FIG. 4A, can contactingly surround each of the stress inducing regions 212.

Figure 4B:
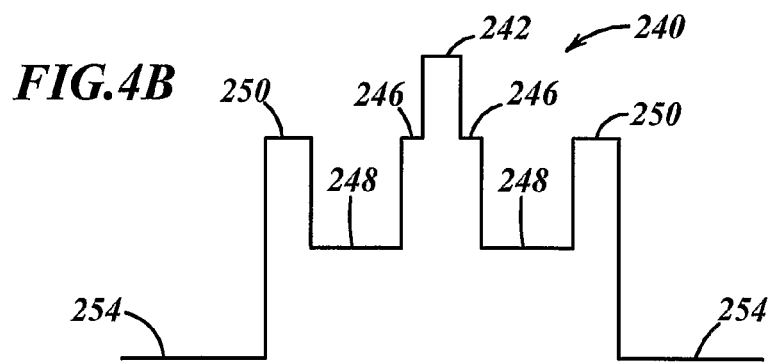
FIG. 4B illustrates an example of one possible refractive index profile along the y axis of the fiber shown in FIG. 4A.
Figure 4C:
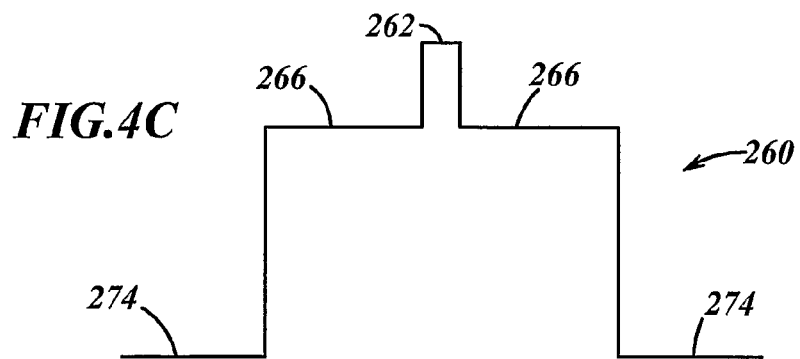
FIG. 4C illustrates an example of one possible refractive index profile taken across the x axis of the fiber shown in FIG. 4A.

FIG. 4B illustrates one possible refractive index profile 240 for the fiber 200, where the refractive index profile 240 is taken along the y-axis. FIG. 4C illustrates one possible refractive index profile 260 for the fiber 200, where the refractive index profile 260 is taken along the x-axis. The refractive index profile 240 comprises a central section 242, corresponding to the core 202, sections 246 adjacent the central section 242, corresponding to the portion of the cladding 206 between the core 202 and the stress inducing regions 212, a depressed section 248 corresponding to the stress inducing regions 212, and sections 250 corresponding to the portion of the cladding 206 between the stress inducing regions 212 and the second cladding 208. Sections 254 can correspond to the second cladding 208. Note that the refractive index profile 260, taken along the x axis, is different than the refractive index profile 240 taken along the y-axis. The refractive index profile 260 comprises a raised section 262, corresponding generally to the core 202 and sections 266, corresponding generally to the cladding 206, as well as sections 274 corresponding generally to the second cladding 208.

The refractive index profiles 240 and 260 are idealized. Actual refractive index profiles measured on a preform or from an actual optical fiber drawn from the preform can include other features, as is well known in the art, such as rounded edges between sections and the signature "dip" in the index of refraction of the core due to the burnoff of dopants in the core during the collapse stage of the Modified Chemical Vapor Deposition (MCVD) process (assuming that the MCVD process is used to fabricate the optical fiber perform). Also, each of the sections of the refractive index profile corresponding to a particular region of the fiber indicates that the index of refraction is substantially constant for the region. This need not be true in all practices of the invention. As is well known in the art the index of refraction of a section, such as, for example, the sections 242 and 262 corresponding to the core 202, need not be constant. The index of refraction of the core 202 can be varied according to a predetermined function to provide a particular result. For example, it is known in the art to provide a core 202 comprising a graded refractive index profile, where the profile corresponds to a parabola or other suitable function.

Note that the stress inducing regions 212 can each comprise a lower index of refraction than the cladding 206. It is known in the art that the index of refraction of the stress inducing regions 212 can be adjusted, via the use of various dopants, to be lower than that of the cladding 206, substantially matched to that of the cladding 206, or to even be higher than that of the cladding 206. It is typical, however, for the stress inducing regions to comprise an index of refraction that is lower that an index of refraction of whatever region of the fiber is adjacent to the stress inducing regions to ensure that the stress inducing regions do not guide light.

Figure 5A:
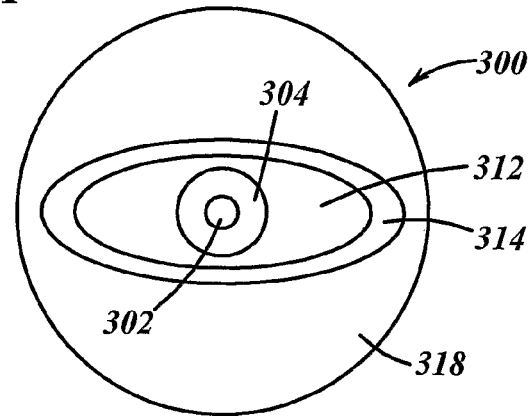
FIG. 5A illustrates an example of another fiber that is understood to be useful with the present invention.

FIG. 5A illustrates another example of an optical fiber 300 suitable for use as the fiber 120 shown in FIG. 3. The optical fiber 300 includes a core 302, a first barrier region 304 disposed about the core 302, and an elliptical stress inducing region 312 disposed about and completely surrounding the first barrier region 304 and the core 302, and a second barrier region 314 disposed about the elliptical stress inducing region 312. The jacket 318 is disposed about the second barrier region 314. At least the first barrier region 304, and preferably the elliptical stress inducing region 312 and the second barrier region 314 comprise an index of refraction that is lower than an index of refraction comprised by the core 302. Accordingly, at least one of the first barrier region 304, elliptical stress inducing region 312 and the second barrier region 314 acts as a cladding of the fiber 300 such that the core 302 can guide optical energy. The first barrier region 304, elliptical stress inducing region 312 and possibly the second barrier region 314 can have substantially the same index of refraction and act as the cladding of the fiber 300, such that the fiber 300 comprises a step refractive index profile, such as that shown in FIG. 4C. The index of refraction of a region can be constant throughout that region. See, for example, fiber described in U.S. Pat. No. 4,896,942, described elsewhere herein. The fiber shown in FIG. 5A can also be designed to be a polarizing fiber by appropriate selection of the indices of refraction of the various regions and the size of those regions. See, for example U.S. Pat. No. 5,056,888.

Figure 5B:
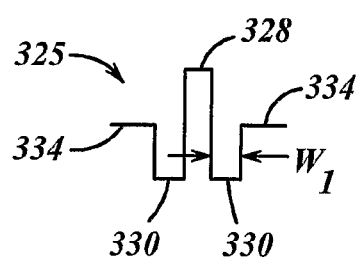
FIG. 5B is an example of a W-shaped refractive index profile along the y axis of a fiber such as the fiber shown in FIG. 5A.
Figure 5C:
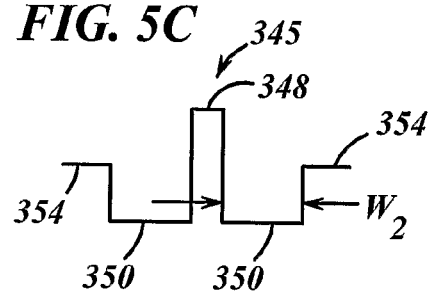
FIG. 5C is an example of a W-shaped refractive index profile along the x axis of a fiber such as the fiber shown in FIG. 5A.

FIGS. 5B and 5C illustrate "W-shaped" refractive index profiles known to be useful with fibers such as those described herein and particular with the fibers shown in FIGS. 1, 4, and 5-6. For example, with reference to FIG. 5B, the refractive index profile 325 includes a section 328, sections 330 and sections 334. The section 328 can correspond to the core of a fiber; sections 330 can each have a lower index of refraction than the section 328 and can correspond to a first region of the fiber disposed about the core; and sections 334 can comprise indices of refraction that are less than the index comprised by the section 328 but greater than the indices comprised by the sections 330. The sections 334 can correspond to a second region disposed about the first region of the fiber. The refractive index profile 325 thus defines a "well" having a width $W_1$. Similar considerations apply to the index profile 345 of FIG. 5C, except that reference numeral 348 corresponds to the core, reference numeral 350 to the first region, and reference numeral 354 to the second region. The W-profile can allow "tunneling" and/or reduce the effective index of selected modes so as to, in certain practices of the invention, provide polarizing behavior over a selected bandwidth.

The refractive index profile shown in FIG. 5B can represent the index profile taken along both the x and y axes of the fiber 300 of FIG. 5A (i.e., the well has the same width $W_1$ along both axes), where the first region comprises the region 304 of the fiber 300 and the second region comprises the region 312 of the fiber 300. Alternatively, the refractive index profile 325 of FIG. 5B can correspond to one of the axes and the refractive index profile 345 of FIG. 5C can correspond to the other of the axes. That is, the well of the "W-shaped" profile has a different widths (e.g., $W_1$ and $W_2$) along each of the axes, which can be accomplished by index matching at least part of the region 312 to the region 304 of the fiber 300 shown in FIG. 5A.

Figure 6:
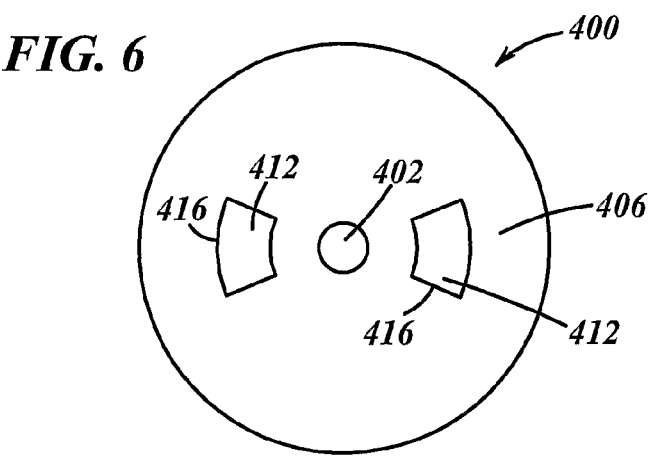
FIG. 6 is a cross section of an additional fiber that is understood to be useful with the present invention.

FIG. 6 illustrates another example of a fiber appropriate for use with the present invention. The fiber 400 is referred to as a bowtie fiber and includes a core 402, a cladding 406 disposed about the core 402 and at least a pair of elongated stress inducing regions 412. Each of the stress inducing regions 412 can include a non-circular outer perimeter, as indicated by reference numerals 416. The fibers 400 and 200 can also each comprise one or both of the refractive index profiles shown in FIGS. 5B and 5C, such as by including a ring shaped region disposed about the cores 202 and 402, where the ring shaped region comprises a suitable index of refraction.

Figure 7A:
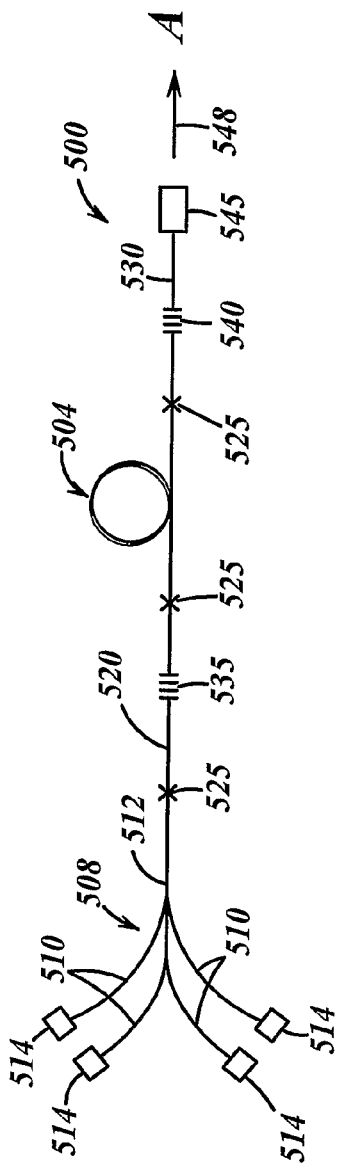
FIG. 7A schematically illustrates one embodiment of a laser according to the present invention.

FIG. 7A schematically illustrates another embodiment of an optical apparatus 500 according to the invention. The optical apparatus 500 includes a length of optical fiber, schematically illustrated as indicated by reference numeral 504 in FIG. 7A, that comprises a rare earth for providing light of a first wavelength responsive to receiving pump light having a pump wavelength that is different than the first wavelength. The length of optical fiber 504 can be positioned into a second position according to the teachings herein to provide an improved polarization ratio relative to when the length of fiber is substantially linearly oriented. The length of fiber can provide polarizing behavior at the first wavelength when in the second position and polarization maintaining behavior substantially linearly oriented. The apparatus can provide a good slope efficiency or relative slope efficiency and/or a good $M^2$ parameter when the length of fiber is in the second position. The length of optical fiber 504 can be a length of normally polarization maintaining fiber, that is, a fiber considered by design by those of ordinary skill in the art to be a PM fiber, as noted above. Typically, as noted above, the length of optical fiber 504 is wound so as to have a plurality of loops, with each of the loops being of constant and substantially the same diameter, where the diameter is selected to provide a selected bend loss for selected modes and/or polarizations.

The apparatus 500 in FIG. 7A is configured as a laser. In the embodiment shown in FIG. 7A, the apparatus 500 includes an optical coupler 508 having a plurality of input fiber arms 510 and an output arm 512. A plurality of light sources 514 for providing pump light, such as, for example, diodes are each optically coupled to the input arms 510 for providing pump light to the rare earth included in the length of fiber 504. If the light sources 514 comprise diodes, the diodes typically include lengths of fiber that can be fusion spliced to the coupler arms 510. The main arm 512 is optically coupled to the length of fiber 504, such as by being fusion spliced to the first length of fiber 520 interposed between the coupler 508 and the positioned length of optical fiber 504. The apparatus 500 can include reflectors 535 and 540 (e.g., gratings, such as fiber Bragg gratings) that define a laser cavity therebetween. Preferably the length of fiber 520 is photosensitive and a second length of photosensitive fiber 530 is in optical communication with the length of fiber 504, such as by being fusion spliced to the length of fiber 504. The reflector 535 is a grating comprised by the length of photosensitive fiber 520 and the reflector 540 is a grating comprised by the length of photosensitive fiber 530. In one embodiment the length of fiber 504 can be photosensitive such that the lengths of fiber 520 and 530 are just extensions of the length of fiber 504, such that splices 525 are not present. Splices allow the fibers that are spliced together to optically communicate. However, as understood by one of ordinary skill in the art, two components, such as two fibers, can optically communicate in a variety of ways, such as, for example, by communicating via free space, with or without the use of lenses, and by other techniques understood by those of ordinary skill in the art.

Preferably, the lengths of photosensitive fiber 520 and 530 are birefringent and provide one of polarizing and polarization maintaining behavior. More preferably, the lengths of photosensitive fiber 520 and 530 comprise polarization maintaining fibers or polarizing fibers. In one practice of the invention, the lengths of photosensitive fiber 520 and 530 are each lengths of polarization maintaining fiber.

One or more of the core diameter, core NA, first cladding diameter, first cladding NA, and second cladding diameter of one or both of the lengths of photosensitive fiber 520 and 530 are preferably substantially identical to the corresponding feature of at least one of the fibers with which the length of photosensitive fiber in question optically communicates, such as, for example, a fiber to which the length of photosensitive fiber in question is spliced. Each of the lengths of photosensitive fiber 520 and 530 is spliced to the length of fiber 504, and hence one or more of the foregoing features of the lengths of optical fiber 520 and 530 can be substantially equal to the corresponding feature of the length of optical fiber 504. The present invention can thus include fibers that are photosensitive and include parameters specified herein as useful for the length of fiber to be positioned as described herein.

One of the reflectors, such as the reflector 540, is less reflective than the other of the reflectors, such as the reflector 535, such that the end cap 545 can radiate an output beam 548. Note that in one practice of the invention, apparatus 500 does not include a light source providing light having the output wavelength to the length of optical fiber 504. The gratings can be written in the photosensitive fiber via exposing fiber to a selected pattern of actinic radiation using a phase mask, interferometric, or physical masking techniques, as is well known in the art. Note that gratings can also be fabricated in a number of other ways, including, but not limited to, selectively thinning the fiber with a microtorch or selectively etching or scribing part of the fiber. Gratings can even be acoustically generated in a length of fiber. Photosensitive fiber is not always required to form a grating in a fiber. Reflectors can also be formed from fiber ends, and one or both gratings can be eliminated. It is also known in the art to use a single distributed reflector, such as a distributed fiber grating, to form a laser.

Optical couplers, such as the optical coupler 508, are well known in the art and are commercially available, and are not further described herein. Pump light can be coupled to the core of the length of fiber 504, or to a cladding disposed about the core, or to both the core and the cladding. Pump light (e.g., light having the pump wavelength) that is coupled to the cladding can typically intersect the core for absorption by any rare earth included by the core. If pump light is coupled to the cladding, the length of fiber 504 typically includes a second cladding disposed about the cladding, as is well known in the art. An optical fiber according to the present invention can be pumped in a variety of ways, including, but not limited to, the use of a coupler shown in FIG. 7A. One example of an alternative technique for directly pumping the cladding is the V-groove technique disclosed in U.S. Pat. No. 6,946,301, issued to Koplow et al. See in particular FIG. 9 of the '301 patent and the accompanying discussion of FIG. 9.

Figure 7B:
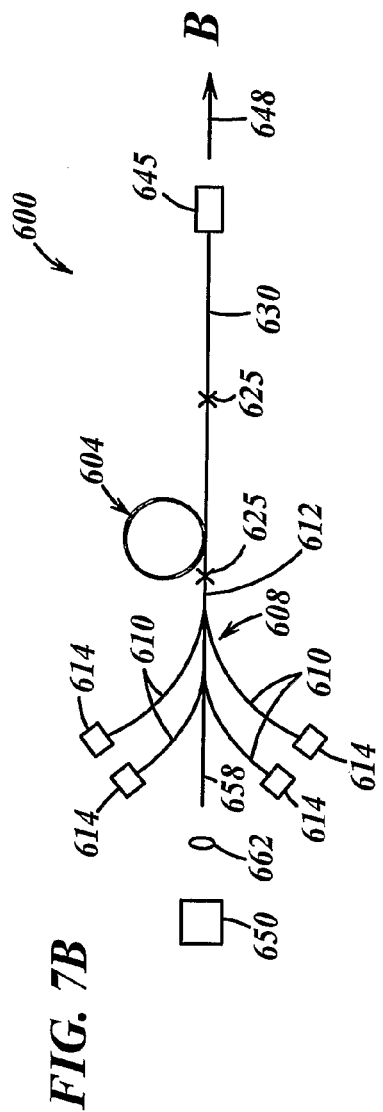
FIG. 7B schematically illustrates one embodiment of an amplifier according to the present invention.

FIG. 7B schematically illustrates another embodiment of the present invention. The apparatus 600 comprises a length of optical fiber 604 that comprises a rare earth for providing light of a first wavelength responsive to receiving pump light having a pump wavelength that is different than the first wavelength. The length of optical fiber 604 is positioned according to the teachings herein to provide the desired polarizing behavior at the first wavelength, wherein when the length of fiber is substantially linearly oriented, the length of optical fiber 604 provides polarization maintaining behavior at the first wavelength. The length of optical fiber 604 can be a length of normally polarization maintaining fiber, that is, a fiber considered by design by those of ordinary skill in the art to be a PM fiber, as noted above. Typically, as noted above, the length of optical fiber 604 is wound so as to have a plurality of loops, with each of the loops being of substantially the same diameter, where the diameter is selected to provide a selected bend loss for selected modes and/or polarizations.

The apparatus 600 in FIG. 7B is configured as an amplifier, and includes an optical coupler 608 having a plurality of input fiber arms 610 and an output arm 612. A plurality of light sources 614, such as, for example, diodes are each optically coupled to the input arms 610 for providing pump light to the rare earth included in the length of fiber 604. If the light sources 614 comprise diodes the diodes typically include lengths of fiber that can be fusion spliced to the coupler arms 610. The main arm 612 is optically coupled to the length of fiber 604, such as by being fusion spliced to the length of optical fiber 604. The optical apparatus 600 can include the end cap 645, which is optically coupled to the length of optical fiber 604 via an interposed section of fiber 630 that need not comprise a rare earth. Reference numerals 625 delineate fusion splices, and reference numeral 648 indicates substantially linearly polarized light provided by the optical apparatus 600. The optical apparatus 600 includes a light source 650 that provides light having the first wavelength for amplification by the rare earth comprised by the length of optical fiber 604.

The light source 650, which can comprise a diode laser having a nearly diffraction limited output, can be optically coupled to an input arm 658 of the coupler 608 by the lens (or lens system) 662. The optical apparatus 600 can thus provide output light that is substantially linearly polarized, as indicated by reference numeral 648. The light source 650 is typically substantially linearly polarized and should be properly aligned with the input arm 658 to ensure that the polarization provided to the length of fiber 604 substantially coincides with the polarization that is most amplified by the length of optical fiber 604.

In one practice of the present invention, the light from the light source 650 is "mode matched" to the fundamental mode of the length of the optical fiber 604. The amount of power delivered to the higher order modes that the length of fiber 604 can support is thus reduced, reducing any amplification of such higher order modes and hence improving the $M^2$ parameter of the light provided by the optical apparatus 604. U.S. Pat. No. 5,818,630, entitled "Single-Mode Amplifiers And Compressors Based On Multi-Mode Fibers", issued Oct. 6, 1998, teaches matching the modal profile of the fundamental mode of a multimode fiber amplifier. As taught in the '630 patent, a mode converter, such as a two lens "telescope" or a section of fiber having a tapered core, as described at column 5, lines 19-34 and FIG. 5 of the '630 patent, can be used to better match light, which can be diffraction limited light, from the light source 650 to the modal profile of the fundamental mode of the length of optical fiber 604. The '630 patent is herein incorporated by reference to the extent necessary to understand the present invention, and to the extent that it is not inconsistent with the teachings hereof. In one practice of the invention, a side pumping technique can be used to provide pump light to the length of optical fiber 604, and a mode converter (e.g., a length of fiber having a tapered core) can be substituted for one or both of the lens 662 and the coupler 608. Alternatively, the output arm 612 of the coupler 608 can comprise a tapered core. Matching the fundamental mode, as used herein, means that at least 50% of power from the light source 650 is delivered to the fundamental mode of the length of the fiber 604. In other practices of the invention, at least 60%, at least 70%, at least 80% or at least 90% of the light from the light source 650 is delivered to the fundamental mode of the length of optical fiber 604. A properly optimized splice between fibers may also function as a mode converter and match light from the light source 650 to the length of optical fiber 604.

Amplified spontaneous emission, or ASE, can be a limiting factor on the power provided by an optical apparatus that provides significant gain, such as, for example, the optical apparatus 604 schematically illustrated in FIG. 7B, which is configured as an amplifier. ASE can be a particular problem with a fiber amplifier that amplifies pulses having one or both of a high energy or a low repetition rate (e.g., repetition rates that are less than 10 kHz). The ASE limits the energy that can be stored by the pump light in the rare earth and hence the energy that can be released by the rare earth at the wavelength of operation of the amplifier. The ASE power produced by a fiber gain medium is understood to be approximated by the formula 2×(hv)×BW×G, where hv is the photon energy; BW is the fluorescence bandwidth of the ASE; and G is the available gain. The factor of 2 accounts for the two polarizations (e.g., the x and y polarizations of the fundamental mode) in which the ASE can propagate. Attenuating one of the polarizations via increased bend loss thus reduces, or even completely eliminates, if the attenuation is high enough, the factor of 2. Removal of the factor of 2 will in theory double the amount of power produced by the optical apparatus.

In practice, however, the increase in output power (e.g., energy per pulse or peak power of a pulse) can be less, depending, for example, on the actual amount of attenuation of one or both of the polarizations. According to the invention, the power can be increased by a factor of at least 1.15, at least 1.30, at least 1.45, at least 1.6 or at least 1.75. Thus the output power of the optical apparatus when in a first position, such as, for example, wherein the length of optical fiber is substantially linearly oriented, will be different than when the length of optical fiber is in a second position, wherein, for example, the length of optical fiber is positioned to selectively increase, via increased bend loss, the attenuation of one of the polarizations relative to the attenuation of the other of the polarizations. The ratio of power in the second position to the power in the first position can correspond to one or more of the foregoing factors (e.g., at least 1.15).

Note that the apparatus 500 and 600 shown in FIGS. 7A and 7B are not mutually exclusive. An apparatus according to the invention can include both a light source 650 and reflectors (e.g., gratings 535 and 540), and the reflectors can serve to narrow the spectrum of the light provided by the apparatus relative to the spectrum that would otherwise be provided by the apparatus.

V-number and NA are parameters that are often specified for an optical fiber. V-number and NA, when discussed herein, refer to the V-number and the NA for the polarization of light that the apparatus of the invention is intended to provide, where the V-number and NA are measured when the fiber is substantially linearly oriented, unless otherwise specified.

The numerical aperture (NA) of a fiber is related to the acceptance angle of the fiber by the formula NA=sin $\Theta_{max}$, where $\Theta_{max}$ is the maximum angle of incidence for a ray that will be guided by the fiber. For a fiber having a first region having step refractive index profile relative to a second region cladding (e.g., the core relative to the cladding or first cladding relative to a second cladding) the NA can be calculated according to the formula:

NA=[(refractive index of first region)$^2$−(refractive index of second region)$^2$]$^{1/2}$ V-number can be described by a simple formula for most fibers:

V=(NA×radius of the core×2π)/free space wavelength of light

For a fiber having a core with a step refractive index profile relative to the cladding, a V-number of greater than 2.405 is generally understood in the art to correspond to a fiber core that can support or propagate more than one mode. Generally speaking, the higher the V-number, the higher the number of modes that the fiber can propagate.

In one practice, the invention includes a length of fiber having, when substantially linearly oriented, a V-number at the wavelength at which the rare earth provides light responsive to being pumped of no less than 3; no less than 3.5; no less than 4.0; no less than 4.5; no less than 5; no less than 7.5; and no less than 10. In some practices of the invention the V-number is no greater than 3; no greater than 3.5; no greater than 4; no greater than 4.5 no greater than 5; no greater than 7.5; and no greater than 10. The V-number can be from 3 to 5; from 5 to 7; from 7 to 10; from 3 to 10; from 5 to 10; from 7 to 10; and from 3 to 8.

In one practice of the invention, the core of the fiber of the length of fiber has a NA of no greater than 0.1; no greater than 0.09; of greater than 0.08; no greater than 0.07; no greater than 0.06; and no greater than 0.05. The NA can also be from 0.05 to 0.1; from 0.055 to 0.1; from 0.05 to 0.09; from 0.05 to 0.08; from 0.05 to 0.07; from 0.06 to 0.1; from 0.07 to 0.1; or from 0.08 to 0.1. Other possibilities include a NA from 0.06 to 0.08; or from 0.05 to 0.09.

The core of a fiber of a length of fiber of present invention can have a diameter of at least 15 microns; at least 20 microns; at least 25 microns; at least 30 microns; at least 40 microns; at least 50 microns; at least 60 microns; at least 70 microns; at least 80 microns; and at least 90 microns. Other useful ranges for a core diameter include from 15 microns to 100 microns; from 20 microns to 90 microns; from 25 microns to 85 microns; from 30 microns to 80 microns; and from 40 microns to 70 microns. Additional ranges of interest include a core having a diameter of from 15 microns to 100 microns; from 15 microns to 90 microns; from 15 microns to 80 microns; from 15 microns to 70 microns; from 15 microns to 60 microns; from 15 microns to 50 microns; from 20 microns to 100 microns; from 25 microns to 100 microns; from 30 microns to 100 microns; from 40 microns to 100 microns; from 50 microns to 100 microns; from 60 microns to 100 microns; from 70 microns to 100 microns; or from 80 microns to 100 microns.

In one aspect, practice of the present invention provides light having primarily a selected polarization. According to the prior art, light having primarily a selected polarization, such as, for example, highly linearly polarized light, is obtained using an optical fiber by using an auxiliary polarizing element, such as, for example, a polarizer plate in optical communication with a PM optical fiber, or a polarizing grating that is included in the PM fiber and reflects or transmits one polarization very differently than the orthogonal polarization (see, for example, B. Ehlers, F. Doerfel, S. Heinemann, C.-H. Liu and A. Galvanauskas, SSDLTR Technical Digest, Pumps-5, New Mexico, 2003), or with the use of fiber Bragg gratings written into PM fiber acting as the polarization selective element (see for example P. Niay, P. Bernage, T. Taunay, M. Douay, E. Delevaque, S. Boj, B. Poumellec, IEEE Photon. Technol. Lett., v. 7, p. 391, (1995) and W. H. Loh, B. N. Samson, L. Dong, G. J. Cowle and K. Hsu, J. Lightwave Techn., v. 16, p 114, 1998). This latter approach is attractive in removing the need for external components to select polarization, but is most often used in low power applications and may not be applicable as fiber lasers approach kilowatt output power levels (see for example J. Nilsson, Y. Jeong, C. Alegria, R. Selvas, J. Sahu, R. Williams, K. Furusawa, W. Clarkson D. Hanna, D. Richardson, T. Monro and D. Payne, Proc. OFC 2003, v. 2, p. 685, 2003). Practice of the invention can allow, in some embodiments, an optical fiber amplifier or laser to provide linearly polarized light having a selected polarization ratio without the need for an auxiliary polarizing element, as is demonstrated in the working example described below.

The birefringence of Panda-style PM fibers depends on the composition, size and position of the stress elements. Tankala et al. have described in detail the theoretical, geometrical and manufacturing considerations for PM fiber birefringence, particularly with reference to double clad fibers (see for example K. Tankala, A. Carter, D. P. Machewirth, J. Farroni, J. Abramczyk and U. H. Manyam, SPIE proc v. 4974, p 220, 2003, incorporated herein by reference). As a result of the birefringence, the waveguide properties for polarizations along the slow and fast axes are different. This can lead to differences in mode field diameters and cut-off wavelengths for the two polarizations. According to one practice of the present invention, when PM-LMA fibers are selectively positioned (e.g., coiled), the dual phenomena of mode stripping and polarization stripping (e.g., polarizing behavior) can occur simultaneously, along with amplification of a selected wavelength, all in the same length of optical fiber. Due to the lower effective index of refraction, light polarized along the fast axis of the fiber will have a slightly larger mode field diameter, and hence, higher macro-bend loss when the fiber is selectively positioned. The extent of polarization stripping for a given position depends at least in part on the birefringence induced by the stress rods. If the properties of the fiber along the fast and slow axes are sufficiently high, the bend loss due to coiling will effectively suppress fast axis polarization and prevent lasing or substantial amplification along the fast polarization, thus providing light that is highly linearly polarized along the slow axis.

Working Examples

In this section, the design and fabrication of an optical fiber apparatus for providing a selected polarization of light is described, and experimental results presented. Because optical fibers that can handle higher powers are of principal interest, the apparatus described below used LMA fibers. The invention is not so limited, however, as is readily understood by one of ordinary skill in the art informed of the present specification. Experimental demonstration of an apparatus according to the present invention using PM-LMA optical fiber having a core diameter of 20 µm coil yielded a laser slope efficiency of ~70% with a polarization ratio (PR) >10 dB, with the apparatus, which was configured as a laser, operating in substantially a single mode.

Two optical fibers are discussed, namely, Fiber A and Fiber B. Both fibers can be considered LMA fibers. Fiber A includes a core having a 20 µm diameter and a first cladding disposed about and adjacent the core and having a 400 µm diameter. Fiber B includes a core having a 30 µm diameter and a first cladding disposed and adjacent the core and having a 250 µm diameter. Both fibers A and B each include a second cladding disposed about the first cladding, where the second cladding comprises an index of refraction that is lower than an index comprised by the first cladding, such that the first claddings can guide light having the pump wavelength. Fibers A and B both include a pair of circular stress inducing regions spaced from and diametrically opposed about the core. Fibers A and B each have a relatively low NA of ~0.06 of the core relative to the first cladding. Two designs were selected to represent two different regimes of birefringence. Fiber A has a core/clad ratio of 0.05 and Fiber B has a core/clad ratio of 0.12 and hence have different limits on the maximum size of the stress rods they can accommodate, which relates to the maximum achievable birefringence. Fibers A and B are manufactured by inserting stress rods into holes sonically drilled into the cladding of a preform, and the holes cannot be drilled too close to the core of the preforms. Similarly, the diameter of the inner cladding can limit the diameter of the stress rods. Fibers were modeled according to standard methods, such as those described in the thesis of Bent Edvold entitled "Polarization Maintaining Fibers", Electromagnetics Institute, Technical University of Denmark, EF-402, April 1994. Fiber A had a predicted birefringence of $4.56 \times 10^{-4}$ and Fiber B had a predicted birefringence of $1.39 \times 10^{-4}$. The actual birefringence of these fibers depends on factors such as core-ovality and composition, and is slightly different from the calculated value. Yb-doped PM-LMA fibers fitting the two designs were fabricated using solution doping and MCVD, and characterized for absorption, geometry, optical properties and birefringence, as described in Tankala et al. The properties of the two fibers are summarized in Table 1.

TABLE 1

Geometric and optical properties for Fibers A and B

| Stress Member Type | Fiber A Dual Circular Diametrically Opposed Stress Rods (Panda) | Fiber B Dual Circular Diametrically Opposed Stress Rods (Panda) |
|---|---|---|
| Core Diameter (µm) | 20 | 30 |
| Core NA | 0.060 | 0.056 |
| First Clad Diameter (µm) | 400 | 250 |
| First Clad NA | 0.46 | 0.45 |
| Absorption at 915/975 nm (dB/m) | 0.56/1.85 | 1.09/3.60 |
| Crosstalk (dB) 10 meters, uncoiled | −45 | −26 |
| Beat Length normalized to 633 nm (mm) | 1.52 | 4.66 |
| Birefringence ($\times 10^{-4}$) | 4.17 | 1.36 |

Figure 8:
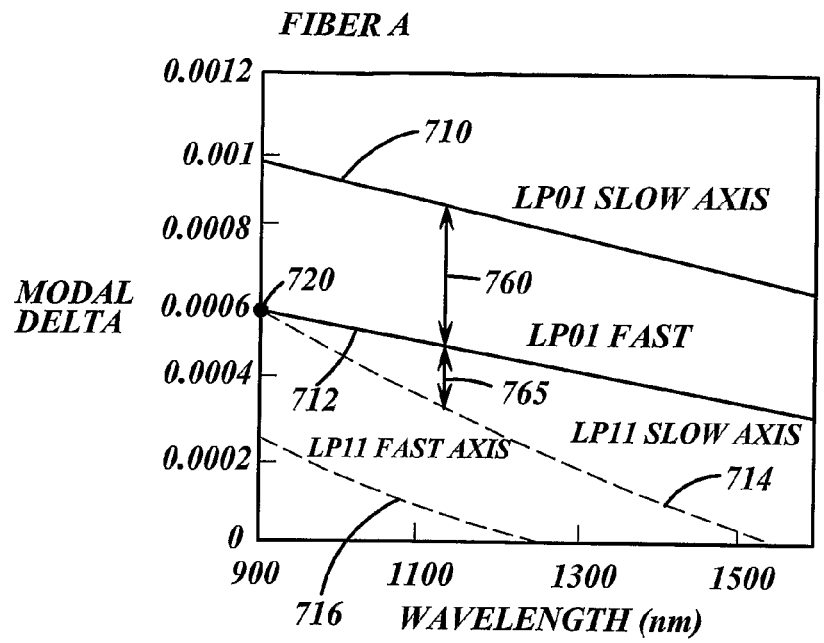
FIG. 8 plots modal index delta for selected modes and polarizations of a first selected fiber (Fiber A)
Figure 9:
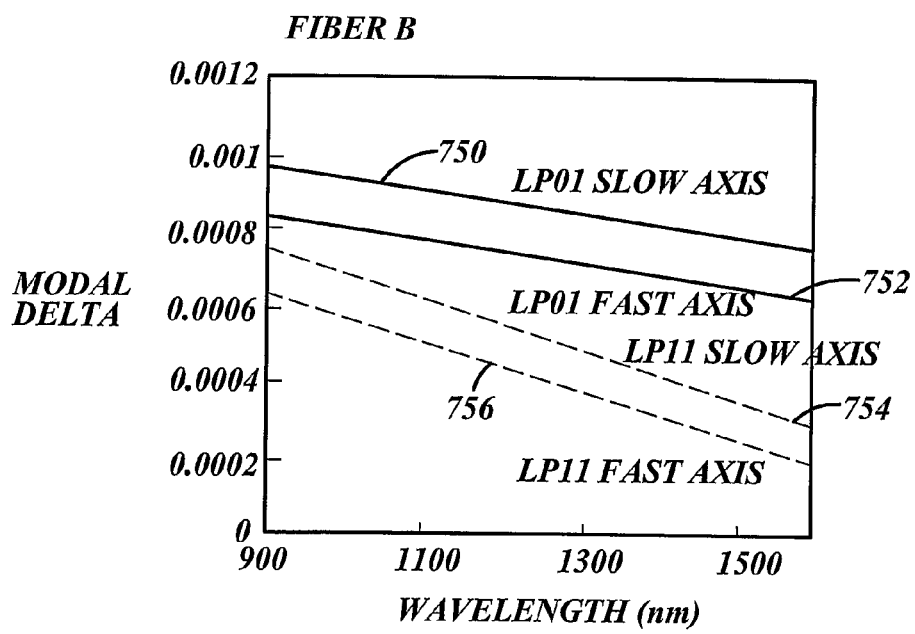
FIG. 9 plots modal index delta for selected modes and polarizations of second selected fiber (Fiber B)

FIGS. 8 and 9, respectively, plot the modal index delta, which is the effective index for the polarization and mode in question relative to the index of refraction for optical silica glass. The effective index calculations are made according to numerical formulations understood to those of ordinary skill in the art, taking into account the birefringence of the optical fibers, for Fibers A and B as a function of wavelength and for each of the orthogonal polarizations.

With reference to FIG. 8, which corresponds to Fiber A, reference numeral 710 indicates the plot of the modal index delta for the polarization of light that is parallel to the slow axis of FIBER A for the $LP_{01}$, or fundamental, mode, and reference numeral 712 indicates the modal index delta for the polarization of light that is parallel to the fast axis of FIBER A for the $LP_{01}$ mode. Reference numeral 714 indicates the modal index delta for the slow axis polarization for the $LP_{11}$ mode, and reference numeral 716 indicates the modal index delta for the fast axis polarization for the $LP_{11}$ mode.

With reference to FIG. 9, which corresponds to Fiber B, reference numeral 750 indicates the plot of the modal index delta for the polarization of light that is parallel to the slow axis of FIBER A for the $LP_{01}$, or fundamental, mode, and reference numeral 752 indicates the modal index delta for the polarization of light that is parallel to the fast axis of FIBER B for the $LP_{01}$ mode. Reference numeral 754 indicates the modal index delta for the slow axis polarization for the $LP_{11}$ mode, and reference numeral 756 indicates the modal index delta for the fast axis polarization for the $LP_{11}$ mode.

Note that for each mode and for each of fibers A and B, the modal index delta for the slow polarization is higher than that for the fast polarization. With reference to FIG. 8 as an illustrative example, the present inventors discovered that at least for a selected wavelength or range of wavelengths, which can be varied via the design of the fiber, the separation 760 in modal index between, for example, the fast polarization of the $LP_{01}$ mode (curve 712) and the slow polarization of the $LP_{01}$ mode (curve 710) is at least as great as the separation 765 between the fast polarization of the $LP_{01}$ mode (curve 712)

and the slow polarization of the $LP_{11}$ mode (curve 714). As inventors also discovered and as is illustrated generally in FIGS. 8 and 9, the modal index delta for each of the polarizations of the fundamental mode is higher than that of either of the polarizations of the next higher order modes. That is, curves 710 and 712 are both above curves 714 and 716. Given the design parameters of both fibers A and B, the fast polarization state for the fundamental mode ($LP_{01}$) has a higher modal index than that of the slow polarization state for the next highest order mode ($LP_{11}$).

The wavelength range plotted in FIGS. 8 and 9 includes wavelengths at which important rare earths, such as, for example, ytterbium, can provide light responsive to being pumped by light having an appropriate pump wavelength. Because a lower modal index delta means that the light is less bound to the core of the fiber and more susceptible to bend loss, it should be possible, and indeed is demonstrated in by experimental data presented below, to position a fiber that supports more than one mode and/or has a lower NA (e.g., a LMA fiber) to, via increased bend loss, help suppress higher order modes and hence achieve enhanced beam quality as well as favor one polarization over the other.

Figure 10:
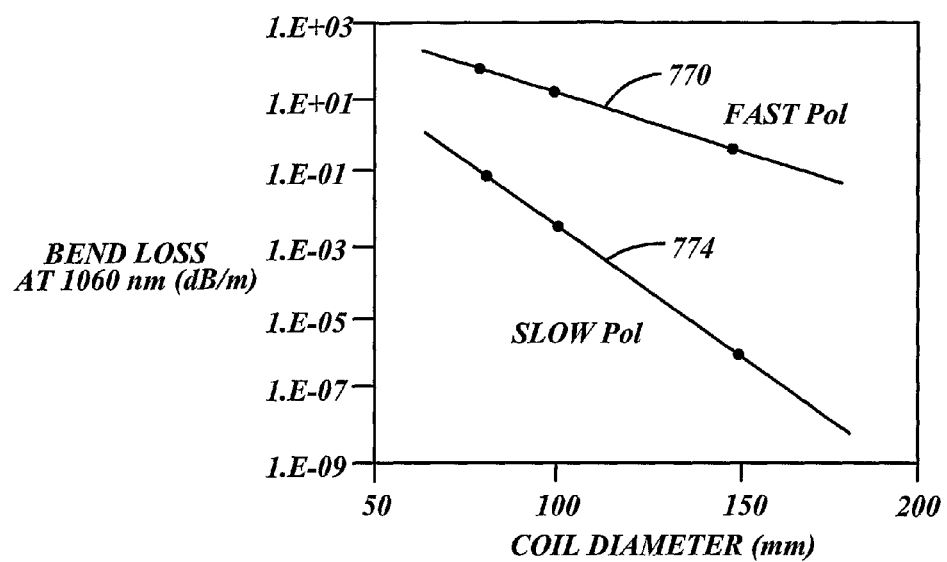
FIG. 10 plots bend loss as function of the diameter of a constant radius coil of Fiber A of FIG. 8.
Figure 11:
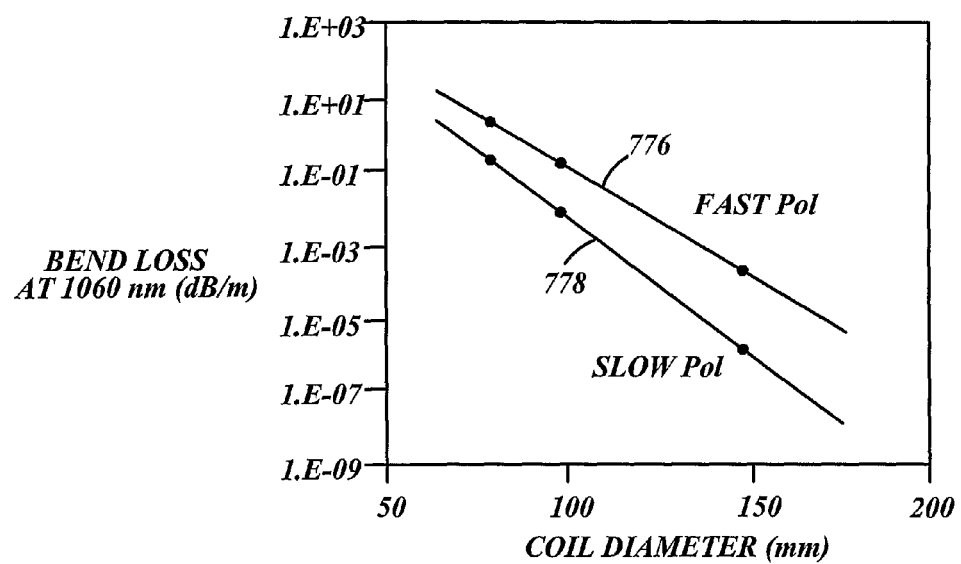
FIG. 11 plots bend loss as a function of the diameter of a constant radius coil of Fiber B of FIG. 9.

FIGS. 10 and 11 are plots of the estimated bend loss of the fast and slow polarization states of the $LP_{01}$ mode for Fibers A and B, respectively, as a function of the diameter of a loop of constant radius and for the wavelength at which a laser or amplifier of the present invention is intended to operate. Because Fibers A and B are doped with the rare earth ytterbium, bend loss calculations are made for a wavelength of 1.06 microns. (Yb in general can provide light from wavelengths ranging from 980 nm to 1080 nm.) The plots of FIGS. 10 and 11 can be generated using a commercially available Computer Aided Design (CAD) program for modeling optical fibers. The Applicants generated FIGS. 10 and 11 using the FIBER_CAD OptiFiber Optical Fiber Design Software (version 1.5) available from Optiwave Corporation, 16 Concourse Gate, Suite 100, Nepean, Ontario K2E 7S8, Canada. See also the optiwave.com website. More generally, the Applicants used the macrobending models of the foregoing software, which are based on the work of J. Sakai and T. Kimura (1978) and Snyder and Love (1983). The foregoing CAD program is of course just one means to arrive at a solution of macrobending losses, and one of ordinary skill, in light of the disclosure herein, can obtain results for macrobending in other ways.

With reference to FIG. 10, reference numeral 770 indicates the curve or plot representative of the bend loss for the fast polarization of the fundamental mode ($LP_{01}$) of Fiber A, and reference numeral 774 indicates the bend loss experienced by the slow polarization of the fundamental mode of Fiber A. There are clearly diameters that can be selected wherein the fast polarization is substantially attenuated and there is a substantial difference in the attenuation of the slow mode and the fast mode. Accordingly, a laser or amplifier will tend to operate so as to provide light substantially polarized in the polarization having the lower loss. Note that if the fast polarization of the $LP_{01}$ mode is substantially attenuated, both polarizations of the next highest $LP_{11}$ mode, (and of any other modes that are supported at wavelength of interest when the fiber is substantially linearly oriented) will also be substantially attenuated, as these higher order modes have an even lower modal index delta than that of the fast polarization of the fundamental mode and are even more susceptible to bend loss. Thus according to the invention fibers can be highly multimode, yet apparatus according to the invention can provide light having a good $M^2$.

With reference to FIG. 11, the reference numeral 776 indicates the plot of the bend loss for the fast polarization of the fundamental ($LP_{01}$) mode of Fiber B and reference numeral 778 indicates the bend loss of the slow polarization of the fundamental mode of Fiber B. The two curves 776 and 778 are less separated in FIG. 11 than the curves 770 and 774 are in FIG. 10. Separation of the two curves 776 and 778, which is desirable from the standpoint of designing certain amplifiers and lasers, is understood to be a function of at least the birefringence of a particular fiber.

With reference to FIG. 8, note that the curve 712, which represents the fast axis polarization of the $LP_{01}$ mode, crosses the curve 714, which represents the slow axis polarization of the $LP_{11}$ mode, at the crossing point 720, which corresponds to a wavelength of about 900 nm. From the slopes of the curves 714 and 712, it is clear that for wavelengths of less than 900 nm, the separation of the curves will increase. The wavelength at which the curves cross is a function of, among other variables, the birefringence of the optical fiber. Increasing the birefringence is understood to move the crossing point 720 to longer wavelengths. Applicants consider that it is possible to operate an apparatus according to the invention to provide light that is highly linearly polarized as well as multimode, by operating at a wavelength to the left of the crossing point 720 (which may be moved to longer wavelengths) and positioning the fiber such that $LP_{01}$ fast axis polarization is more attenuated due to bend loss than the $LP_{11}$ slow axis and $LP_{01}$ slow axis polarizations. Both polarizations of all other modes are also more attenuated than the $LP_{11}$ and $LP_{01}$ slow axis polarizations. There will be some increase in the light provided by an optical apparatus of the invention, due at least in part to both the slow axis $LP_{11}$ and $LP_{01}$ polarizations having lower attenuation. Appropriate selection of a rare earth and the birefringence of the fiber can facilitate such operation. For example, Nd is known to provide light having a wavelength of about 910 nm responsive to appropriate pumping. Samarium has a transition at 650 nm, and terbium a transition at 540 nm. Use of appropriate host glass (e.g., fluoride or phosphate glass) may facilitate obtaining a desired transition.

Fiber A was considered most suitable for construction of a demonstration laser, due at least in part to the wider separation between the attenuation curves for the slow and fast polarizations of $LP_{01}$ in FIG. 8 than in FIG. 9. The present inventors consider that fiber B is also suitable, but that optimally the birefringence could be increased somewhat, such as, for example, so that the $LP_{01}$ modal index for the fast polarization is at least nearly equal to the $LP_{11}$ modal index in the slow polarization.

Cross-talk measurements of Fiber A helped select an appropriate diameter for coiling Fiber A for operation of a demonstration laser providing light having highly linear polarization. Cross-talk was measured when launching light into the slow and fast axis respectively, while maintaining the fiber in various deployments. Table 2 summarizes the results of the cross-talk measurements. For both polarizations, the cross-talk increases with smaller coil diameter, though the rate of increase is different for the fast and slow axes. While for near-straight fiber, there is only 1.1 dB/m difference between the fast and slow axis launch, the gap between the two polarization states widens with smaller coil diameters. It was also observed that the increase in cross-talk in the fast polarization state was accompanied by an actual drop in the transmitted power, confirming that the bend loss difference between the two polarizations was responsible for the differential cross-talk. From this data, we concluded that appropriate initial coil diameters for the demonstration laser were from about 8 cm to about 10 cm in order to obtain an appropriate extinction ratio without inducing excessive bend loss for the slow axis polarization.

TABLE 2

Cross-talk of the fiber under different orientations

|  | Coil diameter, cm | | |
| --- | --- | --- | --- |
|  | Straight | 10.2 | 7.6 |
| Cross-talk (slow axis launch) dB/m | −33.6 | −31.2 | −19.7 |
| Cross-talk (fast axis launch) dB/m | −32.5 | −25.3 | NA |

Figure 12:
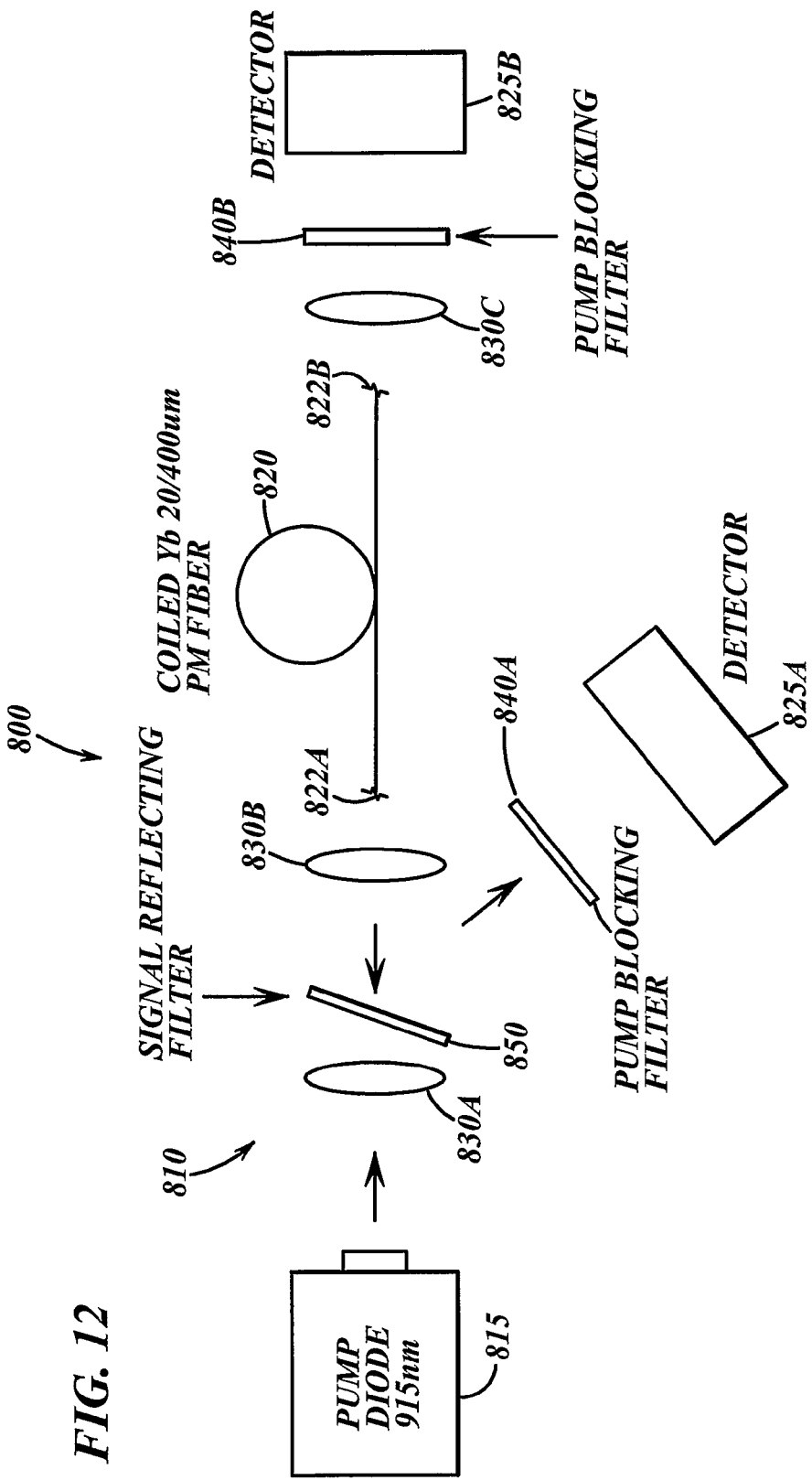
FIG. 12 schematically illustrates a test laser and an arrangement for measuring the test laser of the present invention.

FIG. 12 schematically illustrates apparatus 800, including a laser, indicated generally by reference numeral 810 and the arrangement of measurement equipment for characterizing the laser.

Shown in FIG. 12 are a light source 815 for providing pump light (in this instance a 915 nm pump diode), a length of optical Fiber A, as indicated by reference numeral 820, where the length of fiber 820 includes two cleaved ends 822A and 822B, and two detectors 825A and 825B for measuring the power of light provided by the length of fiber 820. The cleaved ends 822A and 822B, respectively, define a laser cavity, and light leaves the length of fiber 820 at each of the ends 822A and 822B for detection by the detectors 825A and 825B.

Various lenses 830A, 830B and 830C facilitate optical coupling between the light source 815 and the detectors 825A and 825B and the length of optical fiber 820. Filters 840A and 840B block pump light from reaching the detectors 825A and 825B. Filter 850 is dichroic and transmits light having pump wavelength and reflects light having the signal wavelength (the wavelength of the light provided by the rare earth responsive to receiving the pump light) to the detector 825A.

Although the demonstration described herein involves a laser, one of ordinary skill in the art recognizes, based on the disclosure herein, that the present invention can be practiced as an amplifier, as indicated by the apparatus 600 of FIG. 7B. Laser is an acronym for "Light Amplification by Stimulated Emission of Radiation" and that laser can be formed by providing an amplifier with appropriate feedback, such as a resonant structure.

We note that the pump light source 815 can provide up to 15 W at 915 nm. Because Fresnel reflections from the two cleaved fiber ends 822A and 822B form the laser cavity in the demonstration, the Applicants are confident that no external polarizing components are affecting the measurements. Preferably, a fiber laser would include a high reflector at one end of the laser cavity. We also note that pump coupling efficiency into the length of fiber 820 was around 82%.

The polarization ratio (PR) of the light provided by the laser 810 was measured using a collimator and high-power polarizer mounted on a rotary stage (neither are shown in FIG. 12), which were placed to intercept light from the laser 810. "Polarization ratio (PR)", as used herein, refers to the ratio of the power of light having only one polarization (e.g., the fast polarization) to the power of light having only the orthogonal polarization (e.g., the slow polarization). Polarization ratios are typically provided in dB, and can be measured by using a polarization sensitive detection apparatus, such as a detector and a rotatable polarization filtering element in front of the detector, where the polarizing filtering element passes one linear polarization and blocks the orthogonal polarization.

Figure 13:
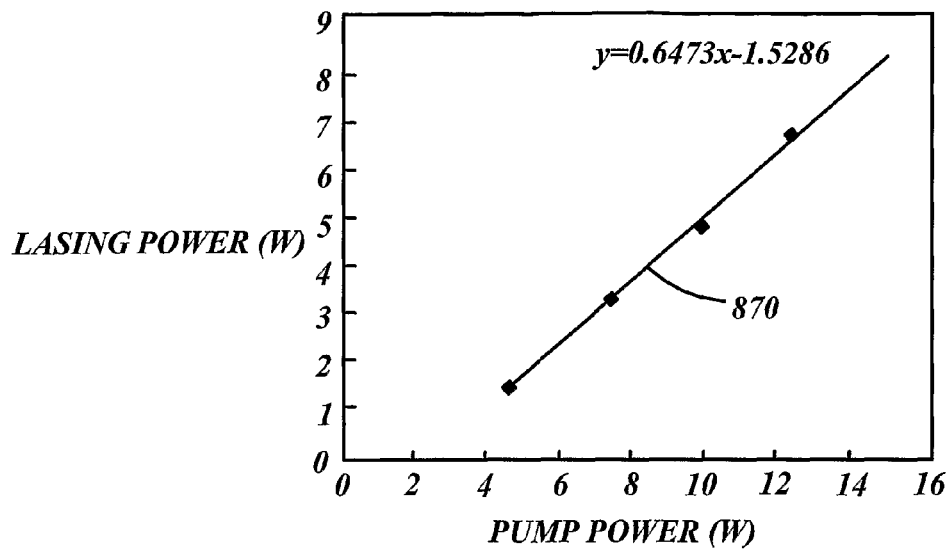
FIG. 13 plots pump light power versus the power of the light provided from a laser according to the present invention, where the power of the light provided is measured using the arrangement shown in FIG. 12.

The laser 810 provided light having a PR measured to be about 20.3 dB. FIG. 13 illustrates the output power of the laser as a function of pump power, as indicated by reference numeral 870. The slope efficiency of the fiber laser 810 is 64.7%. The data presented here is limited only by pump-power of 15 W, and lasing output in excess of 100 W has been obtained with this fiber. These results are in agreement with the cross-talk measurements. Importantly we see no degradation in the PR at the highest powers used, confirming that the technique of the present invention is applicable to higher power operation. Insertion of a polarizing element at the laser output, while not precluded in the practice of the invention, could result in significant loss of lasing power, and could potentially induce instabilities. In one aspect, a fiber used according to the invention can help circumvent this problem, as the lasing is actually suppressed along one polarization, instead of generation followed by loss. Improved slope efficiency results.

Note that the length of optical fiber 820 can be positioned so as to induce additional loss in all of the modes and polarizations, such as by reducing the diameter of the loops of the length of optical fiber. Introducing additional loss can decrease the slope efficiency the apparatus, but may increase the PR. Usually a tradeoff can be made between slope efficiency and PR.

Figure 14:
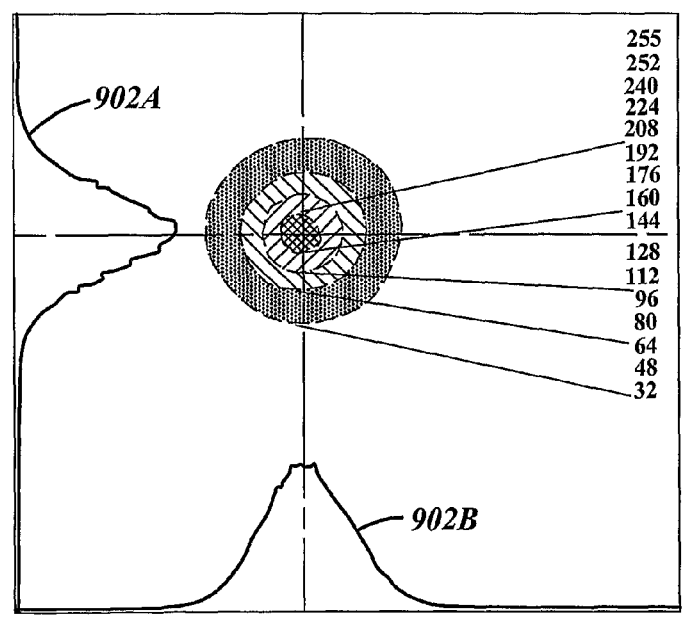
FIG. 14 is a measurement of the beam quality of the light provided from one embodiment of an optical apparatus of the present invention.

FIG. 14 is a plot of an output beam of light provided by the demonstration laser 810, as measured with a Spiricon Model LBA-300 Beam Analyzer. Clearly the light provided has a beam profile that is at least Gaussian, as indicated by reference numerals 902A and 902B, which correspond to the beam profile taken along orthogonal axes. Demonstration of the at least near Gaussian beam quality confirms the behavior as expected from the fiber birefringence and waveguide analysis presented above.

Note the high PR obtained for Fiber A. Preferably, for practice of the invention with the 30 μm core LMA fibers, the fiber birefringence is tailored to the appropriate value so that the $LP_{01}$ fast axis modal index is made close to the $LP_{11}$ slow axis modal index so as to provide a higher power polarized fiber laser. A modified version of Fiber B, having 30 μm core and 400 μm cladding diameters, was fabricated with a birefringence of $3.1 \times 10^{-4}$ to further facilitate use of such a fiber in apparatus according to the present invention. Several hundreds of Watts of output power or more, with polarizing output, are obtainable. Even higher birefringence can be achieved by using larger stress-rods of different compositions, and also changing the cladding size if necessary.

Additional Definitions and Embodiments

Figure 15A:
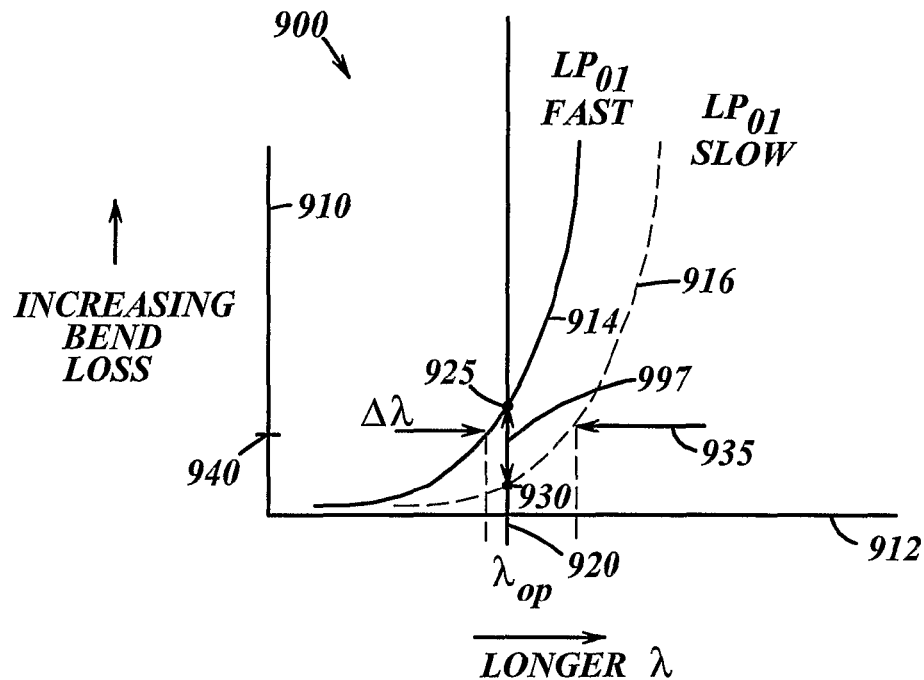
FIG. 15A is a plot of bend loss versus wavelength for each of the first and second polarizations of the fundamental mode of an optical fiber.

FIG. 15A is a plot 900 of bend loss versus wavelength for the two polarizations of the fundamental mode $LP_{01}$ of a first fiber, which can be a LMA fiber positioned according to the teachings herein such that an optical apparatus, such as a laser, amplifier, ASE source or the like, provides a selected polarization ratio and good beam quality. Bend loss, which increases along the vertical axis 910, is plotted versus wavelength, which increases along the horizontal axis 912. The curve 914 corresponds to the bend loss versus wavelength for the fast polarization (i.e., the polarization along the fast axis) of the $LP_{01}$ mode, and the curve 916 corresponds to the bend loss versus wavelength of the slow polarization (i.e., the polarization parallel to the fast axis) of the $LP_{01}$ mode. The fiber can be positioned such that at a first wavelength represented by the vertical line 920 (e.g., the wavelength at which a rare earth comprised by the fiber provides light responsive to being pumped) the bend loss for one of the polarizations, namely, the fast polarization, is higher, as indicated by the reference numeral 925, than the bend loss of the other of the polarizations, namely, the slow polarization, as indicated by reference numeral 930.

The fiber can have a bandwidth, such as is indicated by reference numeral 935, which is distance along the wavelength axis between the two curves 914 and 916 for a selected attenuation, such as the bend loss indicated by reference numeral 940. Bandwidth can be defined in other ways, and the bandwidth appropriate for fiber used with the present invention can depend on a particular apparatus. Bandwidth can be defined by specifying a wavelength range (e.g., 10 nm, 20 nm, 30 nm, 40 nm, 50 nm, 60 nm, 70 nm, 80 nm, 90 nm, 100 nm or greater than 100 nanometers) over which the attenuation (e.g., attenuation due to bend loss) of one polarization exceeds that of the other polarization by a specified amount, such as, for example, at least 0.5 dB, as least 1 dB, at least 2 dB, at least 3 dB, at least 6 dB, at least 9 dB, at least 12 dB, at least 15 dB, at least 18 dB, at least 20 dB or greater than 20 dB. In conjunction with the foregoing, it can be further specified that the attenuation of one of the polarizations is less than or no greater than a specified amount, such as, for example, no greater than 1 dB, no greater than 3 dB, no greater than 5 dB, no greater than 7 dB, no greater than 9 dB, or no greater than 11 dB. Adding this requirement will tend to narrow a given bandwidth specification.

The foregoing definitions for the difference in attenuation of polarizations, without reference to a bandwidth, can also serve to define a particular "polarizing behavior" (to be distinguished, as noted above, from the term "polarizing fiber") at a particular wavelength, such as the wavelength at which a rare earth provides light responsive to receiving pump light.

Bandwidth can also be specified by noting width between the two bend loss curves (or total attenuation curves, e.g., curves generated by including other sources of attenuation, such as background loss and/or scattering loss) specified by requiring that the attenuation of each the two polarizations is substantially equal to a specified amount (e.g., 1 dB, 3 dB, 6 dB, 9 dB, 12 dB, 15 dB, 18 dB, or 20 dB). Reference numeral 935 and 985 of FIGS. 15A and 15B indicates examples of such a technique for defining a bandwidth.

"Polarization maintaining behavior" can also be quantified for certain practices of the invention. For example, in one aspect of invention, polarization maintaining behavior means that the lower attenuation of the two polarizations (e.g., the lower of the attenuations of the fast and slow polarizations of the fundamental mode) is no less than the higher attenuation minus a certain percentage, in dB, of the higher attenuation (e.g., 10%, 15%, or 20%). For example, if the higher attenuation were 1 dB, the lower attenuation should be no less than 0.9 dB if 10% is specified.

Alone or in combination with the foregoing percentage specification, for polarization maintaining behavior the attenuation of two polarizations (e.g., the fast and slow polarizations of the fundamental mode) will typically be no greater than a particular amount, such as, for example, no greater than 1, no greater than 2, no greater than 3, no greater than 4, no greater than 5, no greater than 6, no greater than 7, no greater than 8 or no greater than 9 dB.

The attenuations noted above can be attenuation due only to bend loss or can refer to total attenuation (e.g., bend loss or bend loss and other sources of attenuation, such as background loss) and can be specified per unit length, such as, for example, per meter, per the length of fiber used in a particular apparatus (which can typically range from less than a meter to 20 or 30 meters), or per kilometer (per kilometer would apply where a fiber includes little or no rare earth).

Polarization maintaining behavior typically includes some birefringence, though the amount of birefringence found to be adequate can depend on the tendency of a particular fiber to couple energy between the fast and slow polarizations, such that good polarization maintaining characteristics can allegedly be obtained for lower values of birefringence (See the aforementioned U.S. Published Patent Application US 2002/0172486 A1).

The birefringence of a fiber according to the present invention (typically a fiber demonstrating polarization maintaining behavior) can be no less than $1\times10^{-4}$; no less than $1.5\times10^{-4}$; no less than $2\times10^{-4}$; no less than $2.5\times10^{-4}$; no less than $3\times10^{-4}$; no less than $3.5\times10^{-4}$; no less than $4\times10^{-4}$; no less than $4.5\times10^{-4}$; no less than $5\times10^{-4}$; or no less than $6\times10^{-4}$. Alternatively, the birefringence can be no greater than $1\times10^{-4}$; no greater than $1.5\times10^{-4}$; no greater than $2\times10^{-4}$; no greater than $2.5\times10^{-4}$; no greater than $3\times10^{-4}$; no greater than $3.5\times10^{-4}$; no greater than $4\times10^{-4}$; no greater than $4.5\times10^{-4}$; no greater than $5\times10^{-4}$; no greater than $5.5\times10^{-4}$; or no greater than $6\times10^{-4}$. The birefringence can be from $1\times10^{-4}$ to $6\times10^{-4}$, or from $1\times10^{-4}$ to $3\times10^{-4}$, or from $3\times10^{-4}$ to $6\times10^{-4}$, or from $2\times10^{-4}$ to $5\times10^{-4}$.

Birefringence is related to beat length by the following formula:

Beat length=(free space wavelength)/(birefringence)

Where the birefringence refers to the difference in refractive index for orthogonal polarizations of light (e.g., difference between refractive indices for slow axis and fast axis polarizations)

Ranges of useful beat lengths (beat lengths are for 633 nm) are as follows: In one practice of the invention, the beat length is no less than 0.5 mm; no less than 0.75 mm; no less than 1 mm; greater than 1 mm; no less than 1.25 mm; no less than 1.5 mm; no less than 2 mm; no less than 2.5 mm; no less than 3 mm; and no less than 5 mm. Beat lengths can also be no greater than 0.5 mm; no greater than 0.75 mm; no greater than 1 mm; no greater than 1.25 mm; no greater than 1.5 mm; no greater than 2 mm; no greater than 2.5 mm; no greater than 3 mm; and no greater than 5 mm.

Other ranges include beat lengths from 0.5 mm 0.9 mm; from 0.5 mm to 1.5 mm; from 0.5 mm to 2 mm; from 0.5 mm to 2.5 mm; from 0.5 mm to 3 mm; and from 0.5 mm to 5 mm. Beat lengths can be from 1 mm to 5 mm, from greater than 1 mm to 5 mm; from 1.5 mm to 5 mm; from 2 mm to 5 mm; from 2.5 mm to 5 mm; and from 3 mm to 5 mm.

Typically there will be no overlap between what is considered "polarizing behavior" and that which is considered "polarization maintaining behavior," but applicants note that what might be considered polarizing behavior in one application (e.g., an apparatus that uses a resonant structure, such as a laser cavity, that magnifies the effect of a smaller difference in attenuations of the fast and slow polarizations such that a good overall PR for light provided by the apparatus can be obtained) might be considered in the realm of polarization maintaining behavior in another application (e.g., an optical amplifier, where the effects of a smaller difference in attenuation may not be so magnified and a much smaller PR might be obtained for the light provided by the amplifier).

The foregoing exemplary values are explicitly recited herein to ensure that all combinations thereof clearly understood to be within the scope of the present invention, though not to imply that beat lengths, bandwidths, attenuations, etc. not explicitly recited are outside the scope of the invention.

Positioning the fiber can shift both of the curves 914 and 916 to the left or the right along the wavelength axis 912, such that a selected difference in the bend loss attenuation of the two polarizations is achieved at a selected wavelength. Positioning the fiber may also vary the bandwidth of the fiber.

Figure 15B:
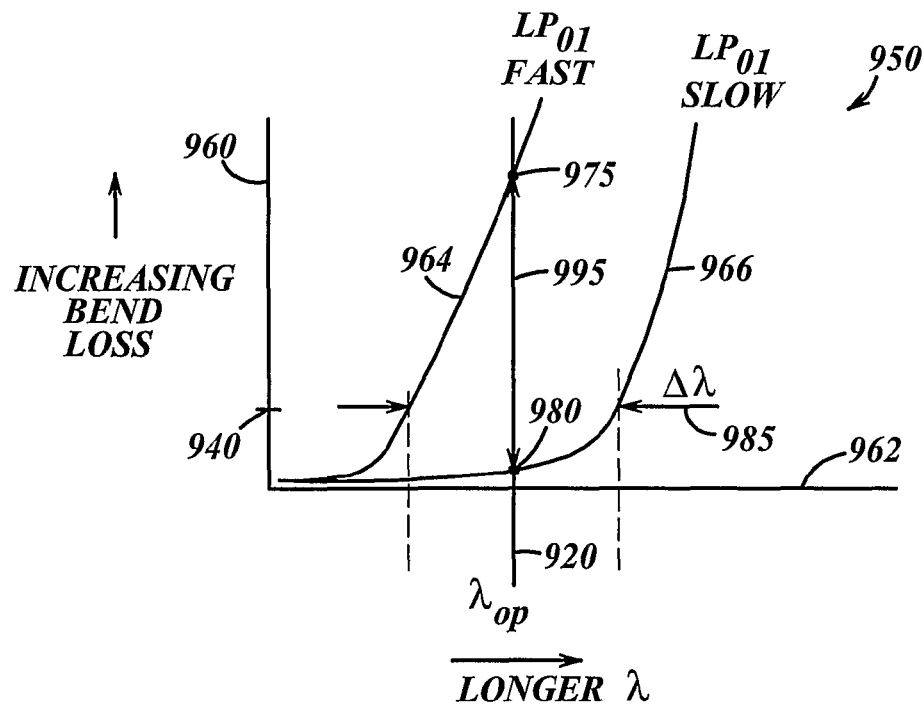
FIG. 15B is a plot of bend loss versus wavelength for each of the first and second polarizations of different optical fiber than the fiber of FIG. 15A.

FIG. 15B is a plot 900 of the bend loss versus wavelength for the two polarizations of the fundamental mode $LP_{01}$ of a second fiber, which can be a polarizing fiber, that can be in optical communication with first fiber, as, for example, is discussed below in conjunction with FIG. 16. Bend loss increases along the vertical axis 960 and the wavelength increases along the horizontal axis 962. The curve 964 represents the bend loss of the fast polarization and the curve 966 represents the bend loss of the slow polarization. Note that at the first wavelength represented by the vertical line 920 the bend loss of the fast polarization is higher than the bend loss of the slow polarization, as can be seen by comparing the points 975 and 980, and that generally speaking the second fiber shown in FIG. 15B has a wider bandwidth than the first fiber of FIG. 15A, as indicated, for one definition of bandwidth, by a comparison of reference numerals 935 and 985.

In one embodiment of the invention, an optical apparatus according to the invention includes the second fiber in optical communication with the first fiber. The second fiber can be a polarizing fiber or, more generally, a fiber that provides the appropriate polarizing behavior by being appropriately positioned. Typically the first fiber includes rare earth and is positioned to provide a first PR, such as by providing polarizing behavior, for light propagated by the first fiber. The second fiber can help improve the PR of light provided by the optical apparatus by further attenuating the disfavored polarization (typically the fast polarization) without attenuating at all, or more practically speaking, attenuating to a lesser degree, and preferably to a much lesser degree, the desired (e.g., the slow) polarization. Thus the difference between the attenuation of the fast and slow polarizations of the fundamental mode for second fiber, indicated by reference numeral 995 in FIG. 15B, is greater than the difference between the bend loss of the fast and slow polarizations for the first fiber, indicated by the reference numeral 997 in FIG. 15A.

In another embodiment of the invention a first fiber having a first polarizing bandwidth optically communicates with a second fiber having second polarizing bandwidth that is different than the first polarizing bandwidth. One of the bandwidths encompasses the other of the bandwidths, meaning that the wavelengths of one of the bandwidths are within ("within" includes the endpoints of a range) the wavelengths of the other of the bandwidths. For example, if the first fiber has a first bandwidth of 10 nm that according to its definition extends from 1055 nm to 1065 nm and the second fiber has a second bandwidth of 20 nm that according to its definition extends from 1050 nm to 1070 nm, the second bandwidth encompasses the first bandwidth. It is also possible for bandwidths to overlap in part, rather than for one bandwidth to encompass the other bandwidth.

Preferably, the bend loss provided by the second fiber at the wavelength 920 for the fast polarization, indicated by reference numeral 975, is higher than the bend loss provided by first fiber for the fast polarization, indicated by reference numeral 925. This need not be the case, however. Also, it is preferable that the bend loss provided by the second fiber at wavelength 920 for the slow polarization, indicated by reference numeral 980, be lower than the bend loss provided by the first fiber for the slow polarization, indicated by reference numeral 930. Both of the foregoing can be true.

FIGS. 15A and 15B are understood to accurately conceptually illustrate certain features, and do not represent experimental data or data obtained from detailed modeling of a particular fiber.

Curves corresponding to higher order modes are not shown in FIGS. 15A and 15B. If shown, such curves would be typically be located (i.e., in many, but not all, embodiments of the invention) to the left of the curves 914 and 916 and to the left of curves 964 and 966 such that the higher order modes would all experience relatively high bend loss. One exception to the foregoing is an embodiment of the invention wherein an optical apparatus provides light that provides a selected polarization ratio but that also includes substantial power in at least one higher order mode.

Figure 16:
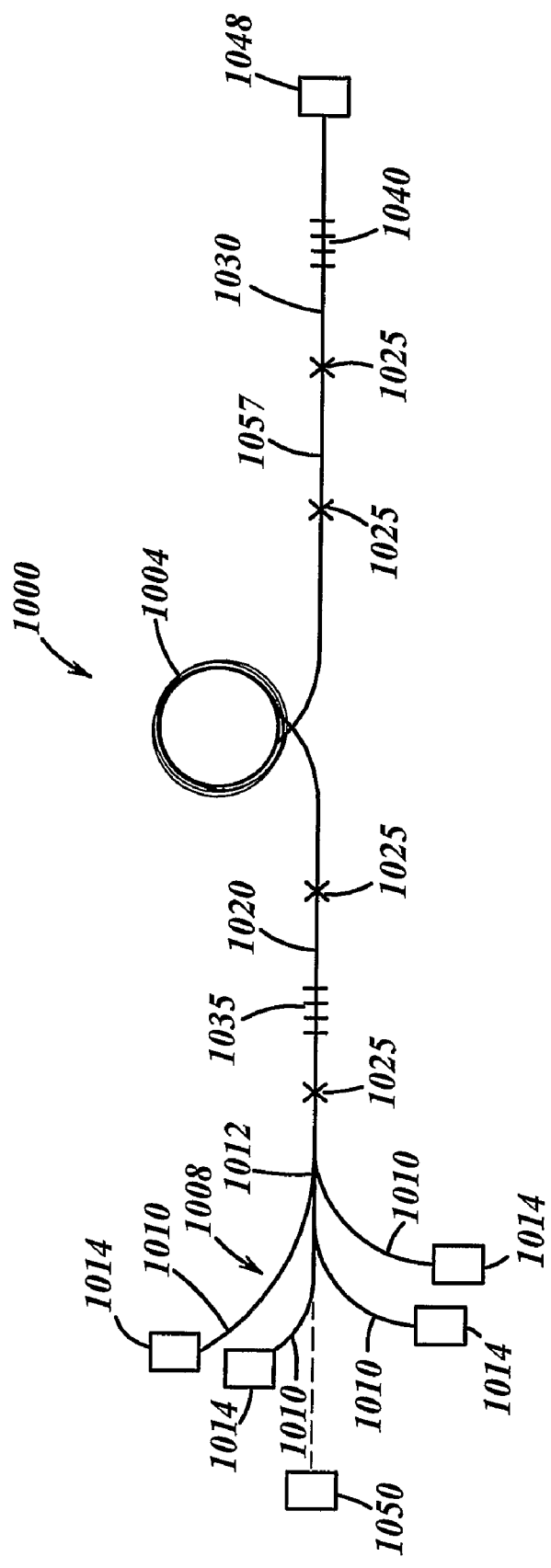
FIG. 16 illustrates another embodiment of an optical apparatus according to the invention.

FIG. 16 schematically illustrates an embodiment of an optical apparatus 1000 that includes first and second fiber such as those discussed above. The optical apparatus 1000 includes a length of optical fiber, schematically illustrated as indicated by reference numeral 1004 in FIG. 16, that comprises a rare earth for providing light of a first wavelength responsive to receiving pump light having a pump wavelength that is different than the first wavelength. The length of optical fiber 1004 is positioned according to the teachings herein to provide the desired polarizing behavior at the first wavelength. In one practice of the invention, the length of fiber 1004 provides polarization maintaining behavior when it is substantially linearly oriented. The fiber 1004 can be a fiber understood by those of ordinary skill to be a normally polarization maintaining fiber, that is, a fiber considered by design by those of ordinary skill in the art to be a PM fiber, as noted above. Typically, as noted above, the length of optical fiber 1004 is wound so as to have a plurality of loops, with each of the loops being of substantially the same diameter, where the diameter is selected to provide a selected bend loss that achieves a selected polarization ratio and/or slope efficiency for light provided by the optical apparatus 1000. The apparatus 1000 is similar to the apparatus 500 shown in FIG. 7A and is only briefly described again.

The apparatus 1000 can include an optical coupler 1008 having a plurality of input fiber arms 1010 and an output arm 1012; a plurality of light sources 1014 optically coupled to the input arms 1010 for providing pump light; a first length of photosensitive fiber 1020 interposed between the coupler 1008 and the positioned length of optical fiber 1004; a second length of photosensitive fiber 1030 that is optically coupled to the length of fiber 1004; and gratings 1035 and 1040 that define a laser cavity therebetween. Preferably, the lengths of photosensitive fiber 1020 and 1030 are birefringent and provide one of polarizing and polarization maintaining behavior. More preferably, the lengths of photosensitive fiber 1020 and 1030 comprise polarization maintaining fibers or polarizing fibers. The apparatus 1000 can include the end cap 1048.

The description given in conjunction with FIG. 7A for apparatus 500 applies equally to the apparatus 1000 shown in FIG. 16. However, as illustrated in FIG. 16, the apparatus 1000 can include a length of fiber 1057 that provides selected polarizing behavior, which is preferably provided over a wider bandwidth than the length of fiber 1004, as indicated above. The selected polarization behavior can enhance the polarization ratio of light provided by the apparatus 1000, such as, for example, light that emanates from the end cap 1048. The length of fiber 1057 can be substantially linearly oriented or can be positioned to provide the desired polarizing behavior. Preferably, the length of fiber 1057 is a length of polarizing fiber.

In the foregoing example the length of fiber 1057 is located "intracavity", that is, within the laser cavity. It is within the scope of the invention to include a length of optical fiber 1057 outside of the cavity, such as to the right of the grating 1040. Although the apparatus 1000 of FIG. 16 is configured as a laser, the length of optical fiber 1057 can also be included in the apparatus 600 illustrated in FIG. 7B, such as by being interposed between the length of optical fiber 604 and the splice 625 that is to the right of the length of optical fiber 604.

One or more of the core diameter, core NA, first cladding diameter, first cladding NA, and second cladding diameter of the length of fiber 1057 are preferably substantially identical to the corresponding feature of at least one of the fibers with which the length of optical fiber 1057 optically communicates, such as, for example, a fiber to which the length of optical fiber 1057 is spliced.

In the embodiment shown in FIG. 16, the length of optical fiber 1057 is spliced to the length of optical fiber 1004. Thus if the length of optical fiber 1004 comprises a core having a diameter of 30 microns and a NA of 0.055, and a first cladding having a diameter of 400 microns and NA of 0.5, at least one, and most preferably all, of the corresponding features of the length of optical fiber 1057 are preferable substantially identical to those of the length of fiber 1004. Accordingly, a length of optical fiber 1057 (e.g., a polarizing fiber) having a parameter as specified herein (e.g., given by the ranges, preferred, more preferred and most preferred values) as applying to fiber (e.g., a length of fiber that is positioned as taught herein, such as the lengths of fiber 504, 604 and 1004) is within the scope of the present invention. As noted above, the length of fiber 1057 can be a polarizing fiber, such as a fiber having a W-shaped refractive index profile and at least one longitudinally region for inducing stress. The length of optical fiber can be substantially linearly oriented or positioned to provide enhanced polarizing behavior.

In one practice, an optical apparatus according to the invention provides continuous wave (CW) light. In certain practices, pulsed light can be provided, where at least the majority (e.g., all) of the pulses of the pulsed light have a pulse duration of no less than 0.3 picoseconds; no less than 1 picosecond; no less than 100 picoseconds; no less than 1 nanosecond; no less than 10 nanoseconds; no less than 100 nanoseconds; and no less than 1 microsecond. At least a majority of (e.g., all) the pulses can also have a duration of no less than (or, alternatively, less than) 1 millisecond; no less than 10 milliseconds, and no less than 100 milliseconds.

In one embodiment of the invention, an optical apparatus may be Q-switched, such as wherein a laser cavity (e.g., the laser cavity defined by reflectors 535 and 540 in FIG. 7A, reflectors 822A and 822B of FIG. 12, or reflectors 1035 and 1040 of FIG. 16), includes a Q-switching element, such as, for example, a saturable absorber or an acousto-optic modulator. In one practice, an optical apparatus according to the invention is not mode locked.

As described above, Applicants have discovered that an optical fiber, and in particular that a normally PM optical fiber, can be appropriately positioned (e.g., an appropriate coil diameter can be selected) for providing both effective higher order mode filtering in LMA fibers and controlling the polarization state of an optical device, such as a fiber laser or amplifier. Good $M^2$ and/or good slope efficiency can also be obtained.

Several embodiments of the invention have been described and illustrated herein. Those of ordinary skill in the art will readily envision a variety of other means and structures for performing the functions and/or obtain the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teaching of the present invention are used.

For example, the invention can be useful over many ranges of the various parameters discussed herein. By way of example and not of limitation, certain features and ranges of selected parameters relative to features are explicitly recited herein. Combinations of the ranges or features, even if not specifically recited in combination below or above, will be understood by one of ordinary skill to be within the scope of the invention. It is neither possible, nor does it serve the purposes of those who are to understand the teachings herein, that the application constitute a rote encyclopedic recitation of each and every possible combination deemed to be within the scope of the invention.

Accordingly, those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention.

The rare earth provided light having a first wavelength responsive to being pumped by light having a second wavelength that is different than, and usually less, than the first wavelength. The ratio of the second wavelength to the first wavelength defines a first efficiency, or quantum efficiency, and an apparatus of the present invention can provide a slope efficiency that can be characterized by comparison to the first efficiency. One useful comparison is to take the ratio of the slope efficiency to the first efficiency. For example, one apparatus according the present invention received pump light having a wavelength of 915 nm and provided light, responsive to being pumped, having a wavelength of 1060 nm. The first ratio is thus approximately 86.3%. The slope efficiency was measured to be about 70%, or more precisely, 64.7%. The relative efficiency, expressed as the ratio of slope efficiency to quantum efficiency, is therefore 64.7/86.3, or 75%.

It is considered that there can be a tradeoff between slope efficiency and polarization ratio. For example, positioning fiber to increase the bend loss (e.g., decreasing the diameter of loops or coils of fiber) will increase the attenuation of both polarizations and increase the PR, but also eventually decrease the slope efficiency. Further positioning to increase the bend loss is understood to start to decrease both the PR and the slope efficiency.

Thus according to the invention a wide range of polarization ratios and slope efficiencies (or relative efficiencies) can be obtained.

In one aspect, optical apparatus according to the invention can provide a slope efficiency of at least 50%; of at least 55%; of at least 60%; of at least 64%; and of about 65% or less. In some practices, the slope efficiency is from 50% to 60%; from 55% to 64%; from 60% to 64%; from 50% to 64%; and from 55% to 60%. The slope efficiency can also be no greater than 64%; no greater than 60%; no greater than 55%; and no greater than 50%.

In another aspect, optical apparatus according to the invention can provide a relative slope efficiency of at least at least 50%; of at least 55%; of at least 60%; of at least 65%; of at least 70%; and of at least about 75%. In some practices, the relative slope efficiency can range from 50% to about 75% or from 55% to about 70%.

Various polarization ratios are possible, such as in combination with the foregoing slope efficiencies or relative efficiencies. In one aspect, the invention can provide light having a polarization ratio (PR) of at least 10 dB; at least 12 dB; at least 14 dB; at least 16 dB; at least 18 dB; or at least 20 dB. In some practices, the invention can provide a PR of from 10 dB to 14 dB; from 14 dB to 18 dB; from 18 dB to 20 dB; and from 10 dB to 20 dB. The PR ratio can be no greater than 20 dB; no greater than 18 dB; no greater than 16 dB; no greater than 14 dB; no greater than 12 dB; and no greater than 10 dB.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, $7^{th}$ Edition, Revision.

What is claimed is:

1. Optical apparatus for providing light having a selected linear polarization having a polarization ratio, said apparatus comprising a length of optical fiber and comprising a rare earth for providing light having a first wavelength responsive to said optical fiber receiving pump light having a second wavelength that is different than said first wavelength, wherein when said length of optical fiber is placed in a first position wherein said length of fiber is substantially linearly oriented said fiber supports at said first wavelength a fundamental mode and a plurality of higher order modes and said apparatus provides light having a first polarization ratio for the selected linear polarization and an parameter, said optical apparatus being configured such that said length of fiber is positioned in a second position that increases the bend loss of said fiber relative to said first position such that, responsive to said increased bend loss, said apparatus provides light having a reduced $M^2$ parameter relative to said $M^2$ parameter as well as a second polarization ratio for the selected linear polarization that is increased relative to said first polarization ratio such that said second polarization ratio is at least 6 dB greater than said first polarization ratio, and wherein when said length of fiber is in said second position the apparatus provides a slope efficiency that is at least 50% of the ratio of said second wavelength to said first wavelength.

2. The optical apparatus of claim 1 wherein said reduced $M^2$ parameter is no greater than 4.

3. The optical apparatus of claim 2 wherein said reduced $M^2$ parameter is no greater than 2.5.

4. The optical apparatus of claim 1 wherein said slope efficiency is at least 70% of the ratio of said second wavelength to said first wavelength.

5. The optical apparatus of claim 1 wherein said second polarization ratio is at least 8 dB greater than said first polarization ratio.

6. The optical apparatus of claim 1 wherein said first polarization ratio is 0.5 dB or less.

7. The optical apparatus of claim 1 wherein said second polarization ratio is at least 10 dB.

8. The optical apparatus of claim 1 wherein said second polarization ratio is at least 18 dB.

9. The optical apparatus of claim 1 wherein when substantially linearly oriented said fiber has a V-number for light of said first wavelength of no less than 3.5.

10. The optical apparatus of claim 9 wherein said V-number is no less than 4.

11. The optical apparatus of claim 9 wherein said V-number is no less than 10.

12. The optical apparatus of claim 1 wherein said core of said fiber of said length of fiber has a numerical aperture of no greater than 0.1 and said core has a diameter of at least 15 microns.

13. Optical apparatus for providing light having a selected linear polarization at an output wavelength, said apparatus comprising a polarization maintaining optical fiber having a core and a cladding disposed about said core, said fiber comprising a rare earth capable of providing light having the output wavelength responsive to said optical fiber being pumped by pump light having a wavelength different than the output wavelength, wherein said core of said fiber, when said fiber is substantially linearly oriented, can propagate orthogonal first and second linear polarizations of a fundamental mode, said core of said fiber further being multimode at the output wavelength when said fiber is substantially linearly orientated such that a plurality of higher order modes can be supported by said core, wherein said fiber is positioned such that, due to bend loss and independent of auxiliary polarization apparatus, said higher order modes and said first polarization of said fundamental mode experience increased attenuation relative to when said fiber is substantially linearly orientated and are substantially attenuated and wherein said second polarization of said fundamental mode is substantially less attenuated than said first polarization of said fundamental mode.

14. The optical apparatus of claim 13 wherein when said fiber receives pump light said output light has a polarization ratio of said second polarization to said first polarization of at least 10 dB.

15. The optical apparatus of claim 13 wherein when said fiber receives pump light said output light can have an $M^2$ parameter of no greater than 2.5.

16. An optical apparatus comprising an optical fiber comprising a rare earth for providing light having a first wavelength responsive to said optical fiber being pumped by light having a second wavelength that is different than the first wavelength, the optical fiber being configured to propagate at the first wavelength a fundamental mode and at least one higher order mode, where each of the modes have orthogonal first and second linear polarizations, the first polarizations being substantially parallel, and wherein the effective modal index of the first polarization of the higher order mode at the first wavelength is greater than the effective modal index of the second polarization of the fundamental mode at the first wavelength.

17. The optical apparatus of claim 16 wherein said fiber comprises at least one grating for reflecting light having the first wavelength.

18. The optical apparatus of claim 16 comprising a laser for providing output light having said first wavelength, said laser comprising said optical fiber.

19. A method of providing output light having a selected linear polarization, comprising providing a length of optical fiber comprising a rare earth for providing output light having a first wavelength responsive to the optical fiber receiving pump light having a second wavelength that is different than said first wavelength, where the fiber can support at the first wavelength a fundamental mode having first and second orthogonal linear polarizations and a plurality of higher order modes; bending the fiber so as to increase the bend loss of the higher order modes and the second linear polarization such that the fiber can provide the output light having an improved beam quality in terms of $M^2$ parameter and an improved polarization ratio for light having the first polarization; and refraining from introducing excessive bend loss for the first polarization such that the fiber can provide the output light including the first wavelength and the improved $M^2$ parameter and improved polarization ratio at a slope efficiency of greater than 50% of the ratio of the second wavelength to the first wavelength.

20. The optical apparatus of claim 1 wherein said optical apparatus can operate as a laser, said optical apparatus comprising at least one reflector.

21. The optical apparatus of claim 1 comprising a light source for providing light having the first wavelength for amplification thereof.

22. The optical apparatus of claim 1 comprising a light source for providing said pump light.

23. The optical apparatus of claim 1 wherein said reduced $M^2$ parameter is no greater than 1.2.

24. The optical apparatus of claim 1 wherein said optical fiber comprises at least one stress inducing region for providing birefringence.

25. The optical apparatus of claim 1 wherein if said length of optical fiber is positioned in said first position wherein said length of fiber is substantially linearly oriented said optical fiber would have a beat length of no greater than 5 mm at a wavelength of 633 nm.

26. The optical apparatus of claim 1 wherein if said length of optical fiber is positioned in said first position wherein said length of fiber is substantially linearly oriented said optical fiber has a fast axis and a slow axis for polarized light, said total attenuation in dB per unit length for light polarized along the fast axis being within 10% of the total attenuation in dB per unit length for light polarized along the slow axis.

27. The optical apparatus of claim 13 wherein said optical apparatus can operate as a laser, said optical apparatus comprising at least one reflector.

28. The optical apparatus of claim 13 comprising a light source for providing light having the first wavelength for amplification thereof.

29. The optical apparatus of claim 13 comprising a light source for providing said pump light.

30. The optical apparatus of claim 15 wherein said $M^2$ parameter is no greater than 1.2.

* * * * *